(12) United States Patent
Sagiv et al.

(10) Patent No.: US 7,374,813 B2
(45) Date of Patent: May 20, 2008

(54) CONSTRUCTIVE NANOLITHOGRAPHY

(75) Inventors: Jacob Sagiv, Rehovot (IL); Rivka Maoz, Rehovot (IL); Sidney R. Cohen, Rehovot (IL); Eli Frydman, Courbevoie (FR)

(73) Assignee: Yeda Research and Development, Co., Rehovot (IL)

( * ) Notice: Subject to any disclaimer, the term of this patent is extended or adjusted under 35 U.S.C. 154(b) by 15 days.

(21) Appl. No.: 09/959,207

(22) PCT Filed: Feb. 19, 2001

(86) PCT No.: PCT/IL01/00152

§ 371 (c)(1),
(2), (4) Date: Feb. 6, 2002

(87) PCT Pub. No.: WO01/61330

PCT Pub. Date: Aug. 23, 2001

(65) Prior Publication Data

US 2003/0021967 A1    Jan. 30, 2003

(30) Foreign Application Priority Data

Feb. 20, 2000  (IL)  .................................. 134631

(51) Int. Cl.
*G11B 9/00*   (2006.01)
*B32B 9/04*   (2006.01)
*B32B 3/00*   (2006.01)
*B05D 1/04*   (2006.01)
*B05D 1/38*   (2006.01)

(52) U.S. Cl. .................. 428/338; 428/446; 428/447; 428/448; 428/450; 427/97.3; 427/98.4; 427/402; 427/458; 427/466; 427/472; 427/532; 977/932; 977/943

(58) Field of Classification Search ............... 428/446, 428/447, 450, 409, 333, 338, 339, 448; 427/457, 427/458, 466, 472, 532, 553, 595, 402, 97.3, 427/98.4; 430/269, 272.1, 302, 322, 325; 977/932, 943

See application file for complete search history.

(56) References Cited

U.S. PATENT DOCUMENTS 5,514,501 A * 5/1996 Tarlov .......................... 430/5
5,922,214 A * 7/1999 Liu et al. ...................... 216/2
6,048,623 A * 4/2000 Everhart et al. ............ 428/464

FOREIGN PATENT DOCUMENTS

EP    0 481 362 A2    4/1992

OTHER PUBLICATIONS

R. Maoz et al., "'Constructive Nanolithography': Inert Monolayers as Patternable Templates for In-Situ Nanofabrication of Metal-Semiconductor-Organic Surface Structures—A Generic Approach", *Advanced Materials*, 2000, pp. 725-731, vol. 12, No. 10.
R. Maoz et al., "'Constructive Nanolithography': Site-Defined Silver Self-Assembly on Nanoelectrochemically Patterned Monolayer Templates", *Advanced Materials*, 2000, pp. 424-429, vol. 12, No. 6.
R. Maoz et al., "Nanoelectrochemical Patterning of Monolayer Surfaces: Toward Spatially Defined Self-Assembly of Nanostructures", *Advanced Materials*, 1999, pp. 55-61, vol. 11, No. 1.
F. Keith Perkins et al., "Proximal Probe Study of Self-Assembled Monolayer Resist Materials", *J. Vac. Sci. Technol. B*, 1994, pp. 3725-3730, vol. 12, No. 6.

* cited by examiner

*Primary Examiner*—Michael J Feely
(74) *Attorney, Agent, or Firm*—Browdy and Neimark

(57) ABSTRACT

A patterned organic monolayer or multiplayer film self-assembled on a solid substrate, the pattern consisting in a site-defined surface chemical modification non-destructively inscribed in the organic monolayer or multilayer by means of an electrically biased conducting scanning probe device, stamping device and/or liquid metal or metal alloy or any other device that can touch the organic monolayer or multilayer surface and inscribe therein a chemical modification pattern upon application of an electrical bias.

47 Claims, 11 Drawing Sheets

CONSTRUCTIVE NANOLITHOGRAPHY

REFERENCE TO RELATED APPLICATIONS

The present application is the national stage under 35 U.S.C. 371 of international application PCT/IL01/00152, filed Feb. 19, 2001 which designated the United States, and which international application was published under PCT Article 21(2) in the English language.

FIELD OF THE INVENTION

The present invention relates to a new template-controlled self-assembly of inorganic-organic monolayers/multilayers, referred herein as constructive nanolithography. In particular, the invention relates to the use of organic monolayers that are nondestructively patterned by various scanning probe and/or stamping devices able to touch the monolayer surface and inscribe thereon a chemical modification pattern upon application of an electrical bias.

Abbreviations: AFM: atomic force microscope; NTS: 18-nonadecenyltrichlorosilane; OTS: n-octadecyltrichlorosilane; SE: silver enhancer; STM: scanning tunnelling microscope; TFRSM: thiol-top-functionalized silane monolayer.

BACKGROUND OF THE INVENTION

The production of nanostructures and of organized organic monolayers and multilayers as well as of semiconductor and metal quantum particles, has resulted in some achievements in recent years. The key issue for practical applications resides in good control of the dimensions, spatial location and stability of the assembled nanostructure. Recently, rather good control of the size of metals and semiconductor quantum particles as well as the number and stacking order of definite monolayers in a synthetic multilayer assembly have been achieved. However, genuine submicrometer architecture based on a planned assembly of nanoelements, can be achieved only by appropriate methods of precise positioning, spatial fixation and lateral interconnection of the desired nanostructures. The direct chemical synthesis of nanostructures on a patterned solid template capable of defining the position and lateral dimensions of growing objects might be the proper approach for nanofabrication, provided suitable versatile templates for growing the desired structures can be conveniently manufactured.

Surface nanopatterning of organic monolayers seems promising for preparing such templates with the desired chemical properties on the surface. Indeed, such patterning using conventional techniques of optical methods and lithographic schemes based on local degradation of the monolayer coating have been employed.

The possibility of achieving non-destructive surface patterning of a vinyl-terminated silane monolayer self-assembled on silicon, by the application of an electrical bias to a conducting atomic force microscope (AFM) tip operated in normal ambient conditions has been recently reported by the present inventors (Maoz et al., 1999). The tip-induced transformation was shown to proceed by local electrochemical oxidation of the top vinyl functions of the monolayer, with full preservation of its overall molecular order and structural integrity. It was further shown that such nanoelectrochemically patterned monolayers may be employed as extremely robust, stable templates for the controlled self-assembly of organic bilayer structures with predefined size, shape and surface location (Maoz et al., 1999).

However, post-patterning by chemical methods is subject to constraints posed by the need of site specificity. Only the tip inscribed sites should be affected, leaving the rest of the surface unmodified. Therefore, the use of base monolayer that are chemically sensitive restricts further chemical post-patterning.

SUMMARY OF THE INVENTION

It has now been found, according to the present invention, that the template-controlled self-assembly strategy, referred to herein as "constructive nanolithography", can be extended to the non-destructive patterning of monolayers with top functions different from vinyl, including also inert methyl groups, as well as to planned construction of hybrid inorganic (e.g. metal)—organic surface nanostructures.

It has further been found according to the present invention, that organic monolayers can be patterned by various scanning probe devices including, but not being limited to, AFM, STM, combined AFM-STM, or any other device that can touch the monolayer surface and inscribe on it a chemical modification pattern upon application of an electrical bias.

The present invention thus relates, in one aspect, to a patterned organic monolayer or multilayer film self assembled on a solid substrate, the pattern consisting in a site-defined surface chemical modification nondestructively inscribed in the organic monolayer or multilayer by means selected from the group consisting of an electrically biased conducting scanning probe device, an electrically biased conducting stamping device, an electrically biased conducting liquid metal or metal alloy, and any other device that can touch the organic monolayer or multilayer surface and inscribe therein a chemical modification pattern upon application of an electrical bias.

In another aspect, the invention relates to a nanostructure composed of a material selected from a metal, a metal compound, silicon or a silicon compound, combined with nanoelectrochemically patterned organic monolayer or multilayer templates self-assembled on a solid substrate, wherein said metal, metal compound, silicon or silicon compound is on the top and/or in-between said organic layer templates.

The invention further relates to methods for the preparation of said patterned organic monolayer or multilayer film self-assembled on a solid substrate, and of said nanostructures, and to possible applications thereof.

DESCRIPTION OF THE DRAWINGS

FIG. 1. Magnified top and side views of the marked square in the middle image are displayed below it.

DETAILED DESCRIPTION OF THE INVENTION

Figure 1:
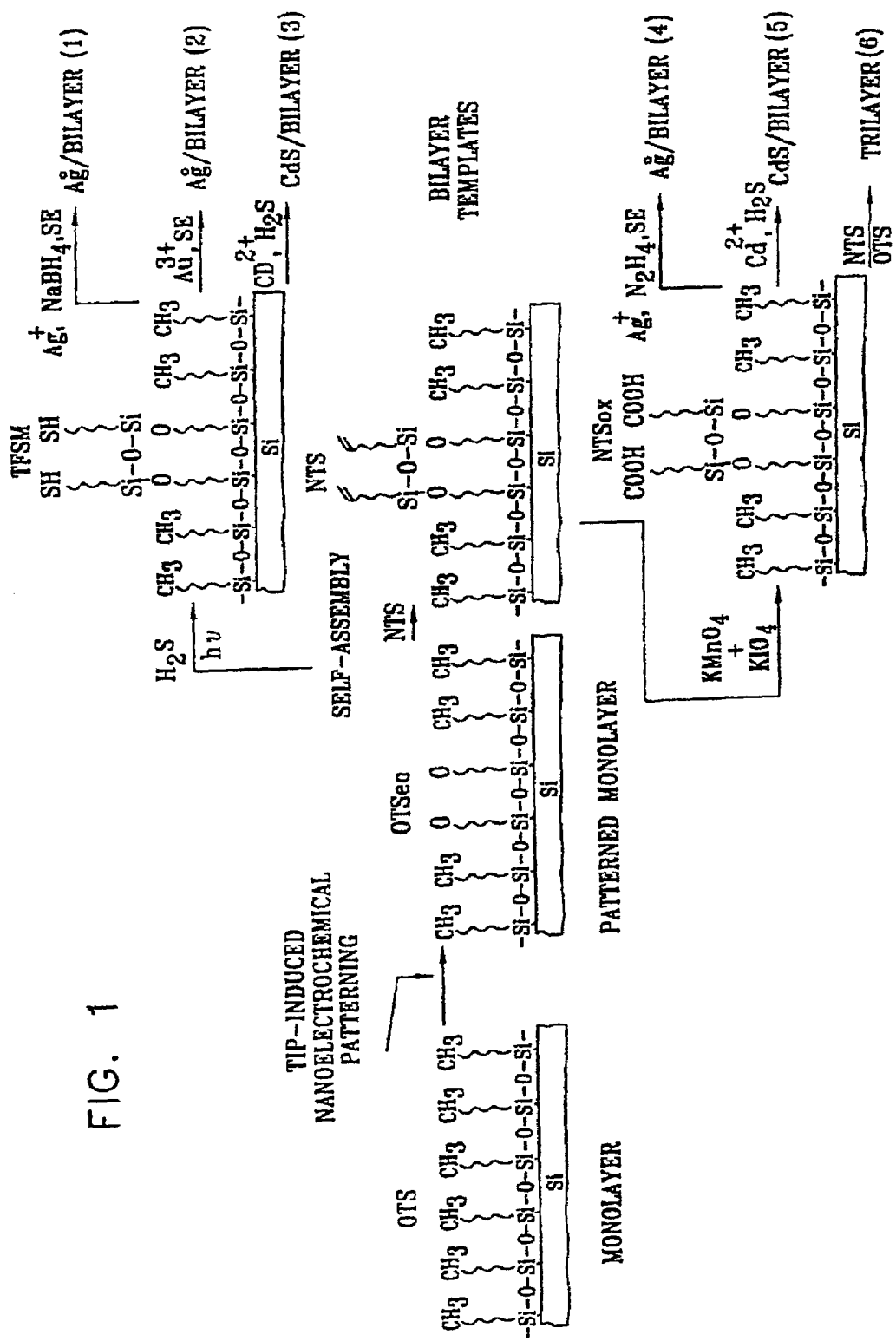
FIG. 1 depicts a schematic representation of constructive nanolithography as a generic approach to the planned surface self-assembly of diverse inorganic-organic nanostructures, including the self-assembly of organic, metal, and semiconductor nanoentities on top of a base organic monolayer template. Six nanofabrication routes are indicated, starting with an "inert" silane monolayer (OTS/silicon) that is non-destructively patterned by an electrically biased AFM tip, to locally form electrooxidized OTS (OTSeo), followed by the selective self-assembly of a vinyl-terminated silane overlayer (NTS) at the OTSeo polar sites defined by the tip. Subsequently, the terminal ethylenic functions of NTS are photoreacted with $H_2S$ in the gas phase or chemically oxidized with aqueous ($KMnO_4$—$KIO_4$) to give the corresponding TFSM/OTSeo or NTSox/OTSeo bilayer template. Site-defined surface self-assembly of metallic silver, cadmium sulfide, or a third organic monolayer can, finally, be achieved using various template-controlled processes. The possibilities depicted here are: (1.4) binding of $Ag^+$ ions to the thiol or the carboxylic acid surface functions of the TFSM (1) and respectively NTSox (4) template, followed by reduction with aqueous $NaBH_4$ or gaseous $N_2H_4$, and further development, if desired, of the silver nanoparticles so obtained with a silver enhancer (SE) solution; (2) binding of a gold species to the TFSM surface, followed by gold-catalyzed silver metal deposition from the SE solution; (3,5) binding of $Cd^{2+}$ ions to the TFSM (3) or the NTSox (5) surface, followed by the formation of CdS upon exposure to $H_2S$; (6) exposure of NTSox to a solution of a self-assembling silane, which results in the formation of an organic trilayer at the tip-inscribed sites.

The present invention provides organic monolayers that can be patterned by a pattern-inscribing lithographic instrument such as a scanning probe device, e.g. AFM, STM, or combined AFM-STM, a stamping device, or liquid metal, or any other device that can touch the monolayer surface and inscribe on it a chemical modification pattern upon application of an electrical bias.

According to one aspect, the present invention provides a patterned organic monolayer or multilayer film self-assembled on a solid substrate, the pattern consisting in a site-defined surface chemical modification non-destructively inscribed in the organic monolayer or multilayer by means of an electrically biased conducting scanning probe device, stamping device and/or liquid metal or metal alloy or any other device that can touch the organic monolayer or multilayer surface and inscribe therein a chemical modification pattern upon application of an electrical bias.

The solid substrate may be silicon, e.g. a slightly conducting silicon wafer substrate or another electrically conducting solid substrate The electrically biased conducting scanning probe device may be a conducting AFM, STM or combined AFM-STM tip; the electrically biased conducting stamping device may be a conducting metal, e.g. copper, grid, a metal plate or a stamp made of a conducting polymer or polymer-metal composite; and the electrically biased conducting liquid metal or metal alloy may be Hg or Ga, or liquid alloys of Hg, Ga, In, Sn or Pb.

According to one embodiment, the invention provides a patterned organic monolayer film self-assembled on a solid substrate, wherein said organic monolayer is obtained by the self-assembly on the substrate of a precursor compound, preferably a precursor compound of the formula R'—Si—RRR, wherein each R, the same or different, is halogen, preferably chloro, lower alkyl, preferably $C_1$-$C_6$ alkyl such as methyl, hydroxy or lower alkoxy, preferably $C_1$-$C_6$ alkoxy such as methoxy, and R' is $C_1$-$C_{30}$ alkyl, partially or fully fluorinated $C_1$-$C_{30}$ alkyl, aryl such as phenyl, cycloalkyl such as cyclohexyl, polycycloalkyl such as adamantanyl, $C_1$-$C_{30}$ alkenyl, or any of these alkyl and alkenyl radicals interrupted by a cycloalkyl or aryl group, by a heteroatom selected from O, S and N, or by an ester (—O—CO—) or amide (—CO—NH—) group, the radical R' being substituted along the chain and/or terminated by a functional group. Examples of preferred $C_1$-$C_{30}$ alkyl and fluoroalkyl radicals according to the invention are $C_{18}$ alkyl and $C_{10}$ perfluoroalkyl, respectively.

The patterned organic monolayer film according to the invention may be obtained, for example by the self-assembly on the substrate of precursor methyl-terminated silane, preferably $CH_3$—$(CH_2)_n$—$SiCl_3$ wherein n=1-30, monolayers, by non-destructive patterning via tip-induced nanoelectrochemical oxidation of their top methyl groups, and optionally further derivatization of the oxidized top group. For example, the oxidized group may be a COOH group, that can then be further derivatized to other desired functional groups.

In one preferred embodiment, the methyl-terminated silane is n-octadecyltrichloro-silane ($CH_3$—$(CH_2)_{17}$—$SiCl_3$), herein in the Experimental and Examples sections referred to as OTS.

The terminal and/or in-between functional group of the patterned organic monolayer film may be selected from Cl, Br, OH, SH, —S—S—, CN, SCN, $NH_2$, (thio)carboxyl, (thio)phosphate, (thio)phosphonate, (thio)sulfate, (thio)sulfonate, (thio)carbamate, (thio)carbonate and (thio)hydroxamate groups.

In one embodiment, the functional group is carboxyl (HOOC), for example the monolayer compound is HOOC—$(CH_2)_n$—SiRRR such as HOOC—$(CH_2)_{17}$—SiRRR that is obtained by oxidation of a monolayer obtained from a $CH_3$—$(CH_2)_{17}$—$SiCl_3$ precursor. In other embodiments, the functional group may be thiol (SH), disulfide (—S—S—), amino ($NH_2$) or phosphate (O—PO—$(OH)_2$) for example the monolayer compound is R'—$(CH_2)_n$—SiRRR wherein R' is thiol, disulfide, amino or phosphate such as HS—$(CH_2)_{17}$—SiRRR, SiRRR—$(CH_2)_{17}$—S—S—$(CH_2)_{17}$—SiRRR, $NH_2$—$CH_2)_{17}$—SiRRR or $(OH)_2$—PO—O—$(CH_2)_{17}$—SiRRR, that are obtained by chemical modification of a monolayer obtained from a $CH_2$=CH—$(CH_2)_{17}$—$SiCl_3$ precursor.

According to another embodiment, the invention provides a patterned organic multilayer film self-assembled on a solid substrate, wherein one or more organic layers are built on top of a base monolayer obtained from a precursor compound of the formula R'—Si—RRR.

In one embodiment, the multilayer is a bilayer film, wherein one monolayer of the formula R'—Si— is built on top of a base monolayer obtained from a compound of the formula R'—Si—RRR. This patterned bilayer may have, for example, one monolayer of the formula COOH—$(CH_2)_n$—Si—, HS—$(CH_2)_n$—Si—, $H_2N$—$(CH_2)_n$—Si— or $(HO)_2$—PO—O—$(CH_2)_n$—Si—, wherein n=1-30, preferably 17, built on top of a monolayer obtained from a precursor of the formula R'—Si—RRR.

In another aspect, the present invention relates to a hybrid inorganic-organic or organic-organic nanostructure composed of a material selected from a metal, a metal compound, silicon, a silicon compound, organic metal or conducting polymer, said material being combined with nanoelectrochemically patterned organic monolayer or multilayer templates self-assembled on a solid substrate, wherein said metal, metal compound, silicon, silicon compound, organic metal or conducting polymer is on the top and/or in-between said organic monolayer or multilayer templates.

In this aspect of the invention, the solid substrate and the patterned organic monolayers or multilayers are as defined above.

The metal may be a noble metal selected from Ag, Au, Pt and Ir, or a metal selected from Cu, Pb, Gi, In, Hg, Pd and Rh. The metal compound may be selected from one or more semiconductors selected from metal chalcogenides (i.e. sulfides, selenides, tellurides), metal arsonides, and mixtures thereof; one or more metal oxides such as oxides of iron, titanium, zinc, tin, silicon, germanium, and mixtures thereof; metal alloys, organic metals, composites of elemental metals or metal alloys with organic polymers, ceramics, and mixtures thereof.

In a further aspect, the invention provides a method for the production of hybrid metal-organic nanostructures as described above, by template-controlled self-assembly strategy, comprising:

(i) assembling a monolayer of a silane compound terminated by a functional group such as —SH or/and —S—S—, on a solid substrate;

(ii) binding a metal ion such as Ag to the functional group of (i); and terminated layer of (ii) by means selected from the group consisting of: an electrically biased conducting scanning probe device, an electrically biased conducting stamping device, an electrically biased conducting liquid metal or metal alloy, and any other device that can touch said organic monolayer surface and inscribe therein a chemical modification pattern upon application of an electrical bias, thus forming the pattern by site-defined reduction of the metal ions to elemental metal particles.

The method can be further processed by developing the elemental metal particles to form self-assembled metal islands or metal films In a further embodiment, there is provided a method for the production of hybrid inorganic-organic or organic-organic nanostructures of the invention, by template-controlled self-assembly strategy, comprising:

(i) assembling a monolayer of a silane compound terminated by a methyl group, on a solid substrate, (ii) non-destructively patterning the top surface of said methyl-terminated layer of (i) by means selected from the group consisting of: an electrically biased conducting scanning probe device, an electrically biased conducting stamping device, an electrically biased conducting liquid metal or metal alloy, and any other device that can touch said organic monolayer surface and inscribe therein a chemical modification pattern upon application of an electrical bias, thus forming the pattern by electrochemical site-defined oxidation of the terminal methyl group, for example to an oxygen-containing group such as COOH, and optionally further chemically modifying this oxidized methyl site to another functional group: and (iii) further generating or binding a metal, metal compound, organic metal or conducting polymer at the modified surface sites of said organic layer of (ii), thus obtaining said nanostructures with a combination of a metal, metal compound, organic metal or conducting polymer and nanoelectrochemically patterned organic monolayer templates self-assembled on a solid substrate.

In still a further embodiment, there is provided a method for the production of nanostructures according to the invention, by template-controlled self-assembly strategy, comprising:

(i) assembling a monolayer of a silane compound terminated by a methyl group, on a solid substrate:

(ii) non-destructively patterning the top surface of said methyl-terminated layer of (i) by means of an electrically biased conducting scanning probe device, stamping device and/or liquid metal or metal alloy or any other device that can touch said organic monolayer surface and inscribe therein a chemical modification pattern upon application of an electrical bias, thus forming the pattern by electrochemical site-defined oxidation of the terminal methyl group, for example to an oxygen-containing group such as COOH, and optionally further chemically modifying this oxidized methyl site to another functional group; and (iii) binding one or more organic layers to the modified surface sites of the organic layer obtained in (ii) above, wherein these layers may be terminated by a methyl or a vinyl group, and after binding each layer non-destructively patterning the top surface of the organic layer or multilayer by a means selected from the group consisting of: an electrically biased conducting scanning probe device, an electrically biased conducting stamping device, an electrically biased conducting liquid metal or metal alloy, and any other device that can touch said organic monolayer surface and inscribe therein a chemical modification pattern upon application of an electrical bias and (iv) further generating or binding a metal, metal compound, organic metal or conducting polymer at the modified surface sites of said organic layer of (iii), thus obtaining said nanostructures with a combination of a metal, metal compound, organic metal or conducting polymer and nanoelectrochemically patterned organic multilayer templates self-assembled on a solid substrate.

In yet still a further embodiment, there is provided a method for the production of nanostructures according to the invention, by template-controlled self-assembly strategy, comprising:

(i) assembling a monolayer of a silane compound terminated by a methyl group, on a solid substrate;

(ii) non-destructively patterning the top surface of said methyl-terminated layer of (i) by a means selected from the group consisting of: an electrically biased conducting scanning probe device, an electrically biased conducting stamping device, an electrically biased conducting liquid metal or metal alloy, and any other device that can touch said organic monolayer surface and inscribe therein a chemical modification pattern upon application of an electrical bias, thus forming the pattern by electrochemical site-defined oxidation of the terminal methyl group, for example to an oxygen-containing group such as COOH, and optionally further chemically modifying this oxidized methyl site to another functional group: and (iii) binding one or more organic layers to the modified surface sites of the organic layer obtained in (ii) above, wherein these additional layers are made of same or different compounds, optionally modified by chemical processes performed after the addition of each layer, after the assembly of several layers, or after the assembly of the entire desired multilayer; and (iv) further generating or binding a metal, metal compound, organic metal or conducting polymer (a) situated on top of said single organic layer; or (b) situated on top of said organic multilayer and/or in-between layers of said organic multilayers.

In a further aspect the invention provides a method for the production of a data storage medium by non-destructively inscribing chemical information on the surface of a methyl-terminated monolayer, for example as that defined above, using an electrically biased conducting scanning probe device such as an AFM, STM or combined AFM-STM tip, or a stamping device, or a liquid metal and reading said inscribed chemical information by means of a scanning probe device such as AFM, preferably operated in the lateral force (friction) mode.

The nanostructures of the present invention have several useful applications. Thus, for example, in electronics, they may be used for the fabrication of novel sub-micron and particularly nanometer-size (below~100 nm) electronic circuits and devices, including quantum electronic devices such as single electron switches (transistors). In biology, they may be used for the fabrication of patterned surfaces tailored to specifically bind biological entities of interests, for bioassay purposes. In the area of miniaturized chemical or biosensors, they may be used for fabricating patterned surface structures with sites displaying predesigned sensitivity toward different chemicals or biomaterials of interest for the purpose of their identification and quantification.

Another important application relates to data storage application of the inscribed surface patterns, even when no nanostructure is built on the surface. Thus, the patterned organic monolayer films according to the invention may be useful for the development of ultrahigh-density data storage media and surface self-assembled electronic circuits of nanometer dimensions. The non-destructive inscription of a stable chemical pattern on the outer surface of a monolayer such as OTS or similar saturated silanes can be used as an attractive novel method of ultrahigh-density data storage (i.e. memory). The data can be inscribed with an electrically biased AFM tip and read in the friction mode (also referred to as lateral force microscopy-LFM). According to the present invention, the information can be easily inscribed in this manner on OTS or a similar monolayer, the stored information is stable and can thereafter be read in a very simple manner. There are a number of apparent advantages this approach may offer: simple and cheap high density data storage medium with very high mechanical, thermal, and chemical stability, simple writing and reading. Unlike many other methods of data storage using AFM that have been proposed, in the present approach the information is not stored as differences in height (topography). This will make the reading much simpler and faster. Since the tip is moving in contact with the surface on which the information is stored (without damaging it), this approach will be free of the problems encountered in present magnetic disks where the magnetic head flies above the surface and may crush into it or damage the disk because of the friction developing at the start of the motion.

The nanostructures according to the invention may be useful for the production of submicron electronic circuits and devices.

The invention will now be illustrated in its various aspects by the following non-limitative Examples and as illustrated in the accompanying Figures.

EXAMPLES

Experimental: Materials and Methods

The NTS precursor monolayers were prepared as described before (Maoz et al., 1999), on double-sided polished p-type silicon wafer substrates (Semiconductor Processing Co., 0.5 mm thick, orientation<100>, resistivity 8-11 $\Omega$ cm). Defect-free OTS/Si monolayers were reproducibly prepared as described before (Maoz et al., 1999), by self-assembly from a 5 mM solution of OTS in bicyclohexyl (BCH), on double-side-polished p-type silicon wafer substrates (Semiconductor Processing Co., 0.5 mm thick, orientation<100>, resistivity 8-11 $\Omega$ cm). For the mixed NTS+OTS monolayers, use was made of adsorption solutions with NTS/OTS molar ratios equal to the desired surface molar ratios. The NTS/OTS molar ratio on the surface was found (from quantitative FTIRspectra) to be practically identical to that of the adsorption solution used for the self-assembly of the respective mixed monolayer. The thiol/disulfide top functions were in situ introduced, through the photo-induced radical addition of $H_2S$ to the terminal ethylenic double bond of NTS. Adsorption of $Ag^+$ ions from a $10^{-3}M$ aqueous solution of silver acetate on the TFSM surfaces, followed by rinsing with pure water in order to remove surplus silver solution that may stick to the surface, finally completed the preparation of the $Ag^+$-TFSM templates.

Figure 8:
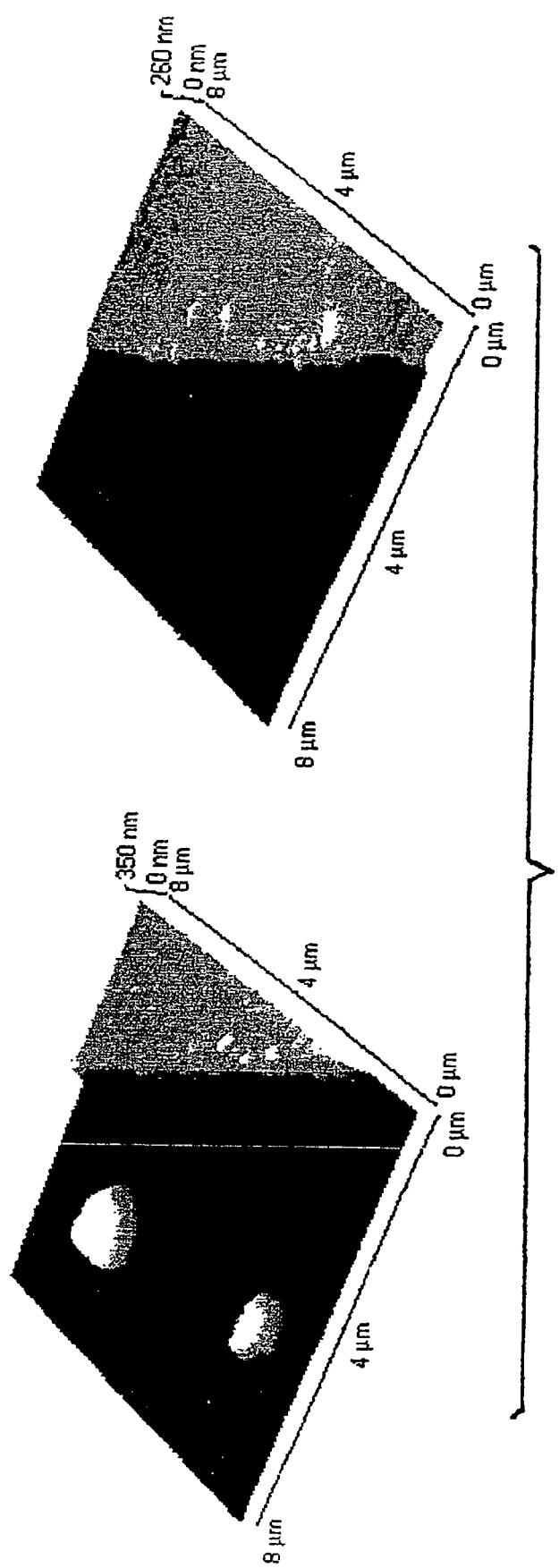
FIG. 8 illustrates a topographic contact-mode AFM images (Topometrix System) showing: (right side) portion of the edge of a millimeter-size silver electrode self-assembled on a $Ag^+$-TFSM template (made from a precursor mixed monolayer with a molar ratio NTS/OTS=1/2) by the wet chemical reduction and development process depicted in FIG. 7, lower path; (left side) two self-assembled silver islands grown at tip-defined sites near the electrode edge shown in the image on the right, via the nanoelectrochemical reduction & development process depicted in FIG. 7, upper path. The tip-induced reduction was done with a bias of +9.0V (applied to the same diamond-coated tip used in imaging) and a scan speed of 2 $\mu ms^{-1}$. Compared to the development of the electrode (which was done with the original silver enhancer), the silver enhancer solution used in the development of the two islands was diluted by a factor of two and the time of contact with the surface reduced from 5 min to 2 min.
Figure 9:
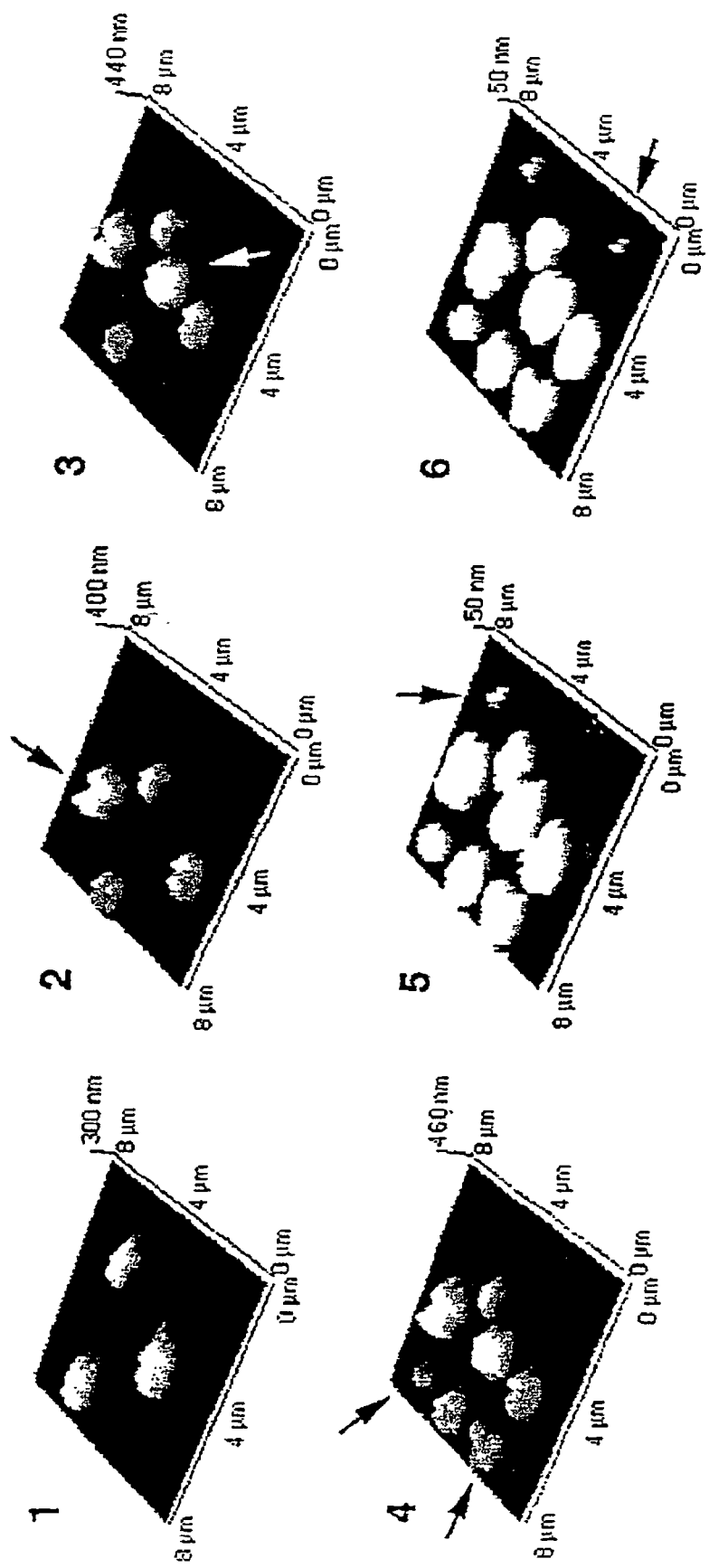
FIG. 9 shows an AFM topographic record of the six successive steps during the fabrication of an array of nine silver islands at tip-defined sites on a $Ag^+$-TFSM template as that of FIG. 8 (using the lithographic process depicted in FIG. 7, upper path). Images were taken in the contact mode (Topometrix System), with the same diamond-coated tip employed in patterning, immediately after each development step (newly added islands are indicated by arrows). To facilitate easy visualization of the much smaller islands added in the last two steps, images 5 and 6 are presented with expanded Z-scales. The tip-induced $Ag^+$ reduction was done with a bias of +9.0V (on the tip) and a scan speed of 2 $\mu ms^{-1}$, in steps 1 and 2, +10.0 V and 1,2 $\mu ms^{-1}$ in step 3, and +10.0V and 1 $\mu ms^{-1}$ in steps 4-6. The concentration of the silver enhancer solution used for the development of the last two islands was lowered by a factor of 250 compared to that used for the other islands (for which the original enhancer solution was also diluted by a factor of two) and the time of contact with the surface reduced from 30 s to 15 s.

Most nanoelectrochemical patterning experiments with $Ag^+$-TFSM (FIGS. 7-10) were carried out as described before (Maoz et al., 1999) under ambient conditions (the surface being now negatively biased with respect to the tip) with a Topometrix TMX 2010 Discoverer system using boron-doped chemical vapor deposited (CVD) diamond-coated silicon probes (Nanosensors) with spring constants of 2-5 N/m, or silicon nitride probes that were coated with silver by metal evaporation. The images shown in FIGS. 8 and 9 were taken with the same probes (without electrical bias) in the contact mode, with minimal contact forces, typically 50 nN or less, including the inherent tip-surface attraction. The writing of the patterns on the OTS/Si monolayers (FIGS. 1-6) was done in the contact mode, with scan speeds of 1-4 $\mu ms^{-1}$, by applying a positive surface bias of 6-9V relative to the tip, depending of the ambient relative humidity. Voltage regimes suitable for non-destructive patterning were separately determined for each new series of experiments (see FIG. 2).

Figure 4A:
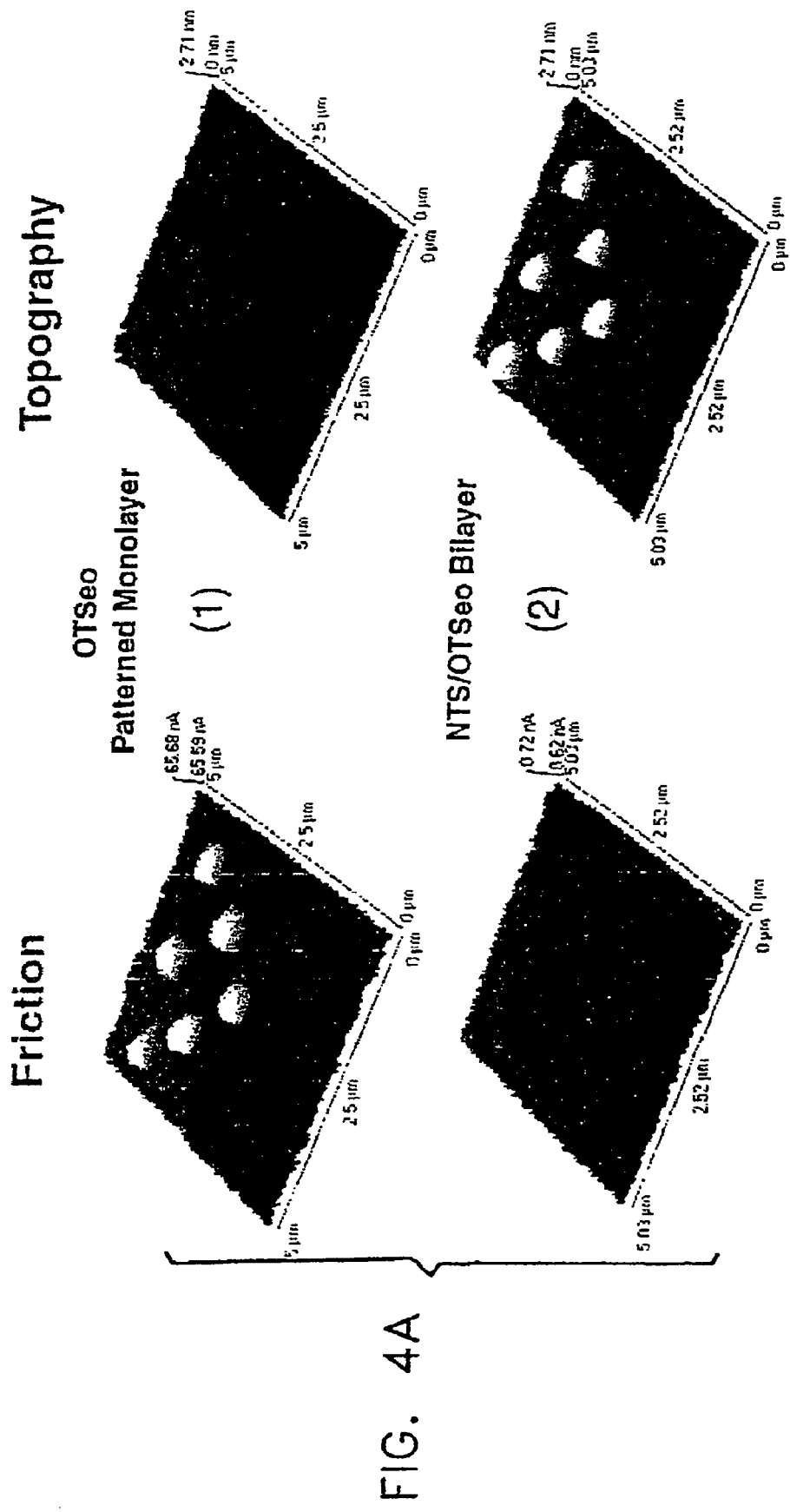
FIG. 4 shows AFM images taken during the fabrication of an array of silver metal islands according to route 2 in FIG. 1: (1) tip-induced inscription of a pattern of electrooxidized OTS (OTSeo) on a base OTS/Si monolayer of the same kind as in FIGS. 2 and 3; (2) following exposure of the patterned OTS monolayer to a 5 mM solution of NTS in BCH, in order to self-assemble a top NTS monolayer at the tip-inscribed sites; (3) after the NTS-treated sample was UV-irradiated in an atmosphere of $H_2S$, in order to photochemically convert NTS to TFSM; (4) result of treatment of the photo-reacted sample with a 2 mM aqueous solution of $HAuCl_4$, followed by a silver enhancer (SE) solution, in order to deposit metal silver under the catalytic action of an ionic gold species adsorbed on the TFSM surface. Images (1)-(3) are friction and topography pairs simultaneously acquired in the contact mode, whereas image (4) was obtained in the intermittent-contact mode, after unsatisfactory initial attempts of contact mode imaging.
Figure 4B:
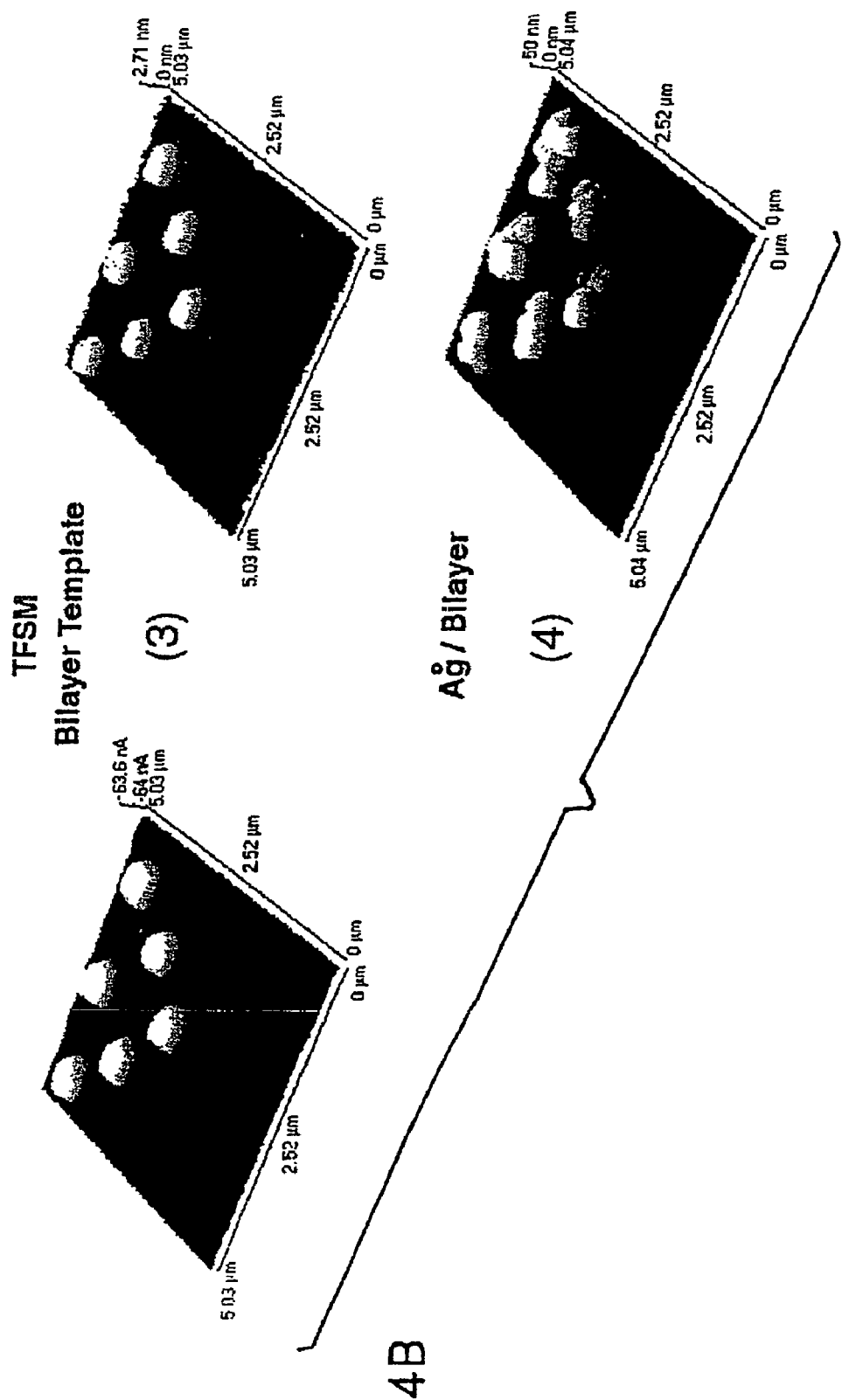
Figure 5:
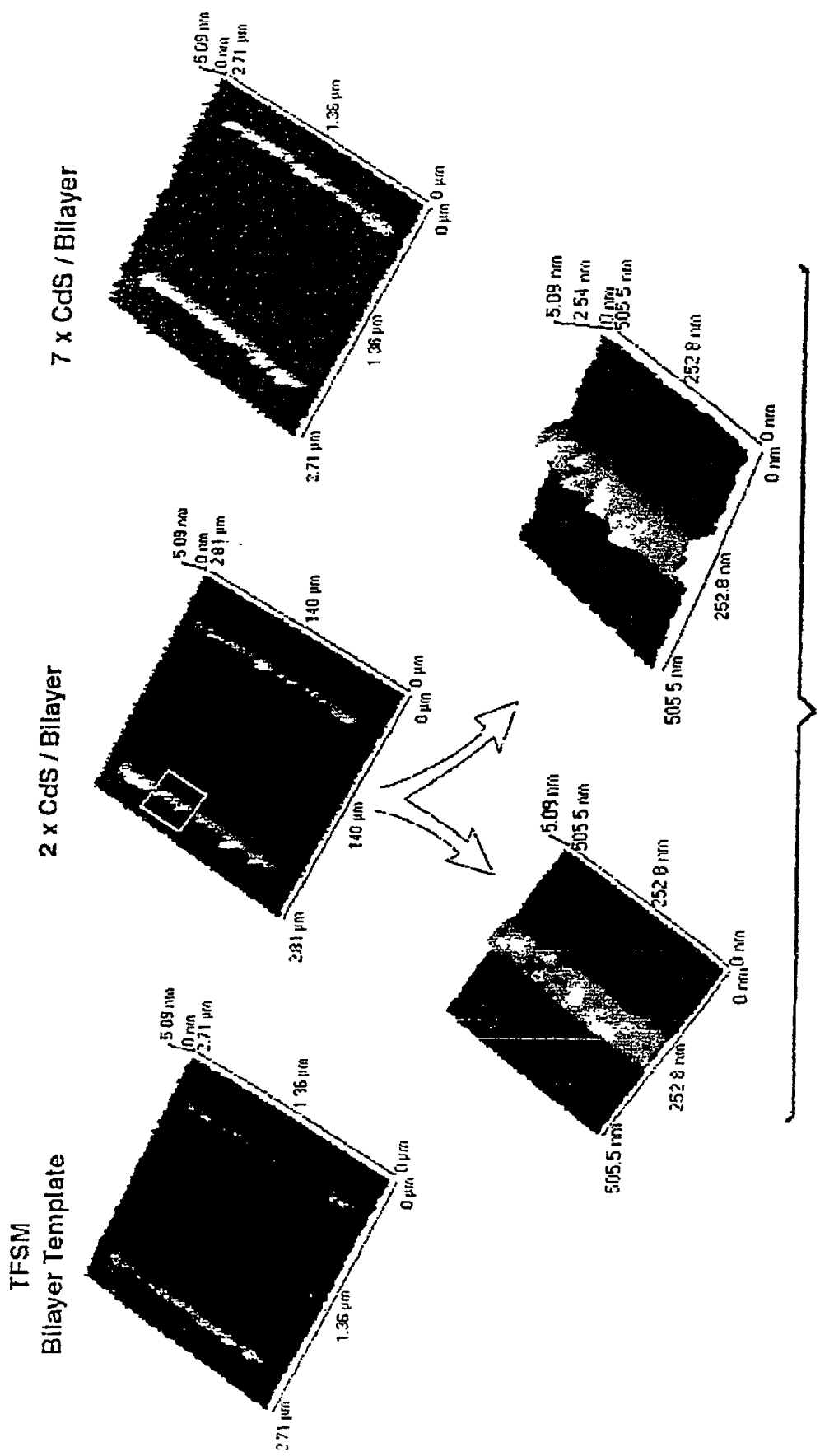
FIG. 5 shows AFM intermittent-contact mode topographic images of two TFSM/OTSeo template lines produced as in FIG. 4, before (left side) and after two cycles (middle) and seven cycles (right side) of cadmium sulfide self-assembly according to route 3.
Figure 6:
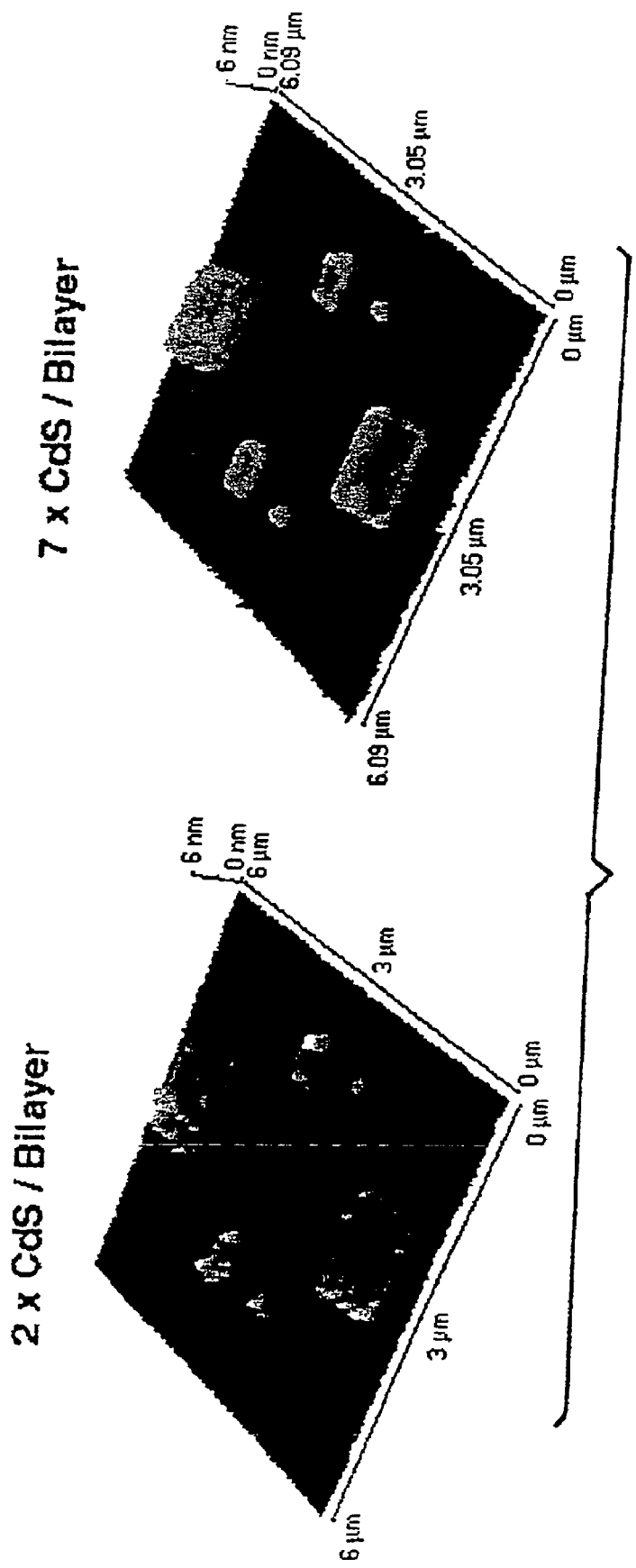
FIG. 6 shows AFM intermittent-contact mode topographic images of cadmium sulfide self-assembled on a TFSM bilayer pattern (as in FIG. 5), taken after two (left side) and seven (right side) cycles of CdS self-assembly. Note the preference for edge nucleation and growth (2×CdS image), and the accumulation of particles in the 7×CdS image compared to the 2×CdS one.

AFM images were acquired either in the contact mode (FIG. 4), with the same probe used for patterning (without electrical bias and minimal contact force, typically 50 nN or less, including the inherent tip-surface attraction), or in the intermittent-contact mode, using the same probe (FIG. 4) or uncoated Si probes (Nanosensors) that are better suited for such imaging (FIGS. 5, 6).

Figure 7:
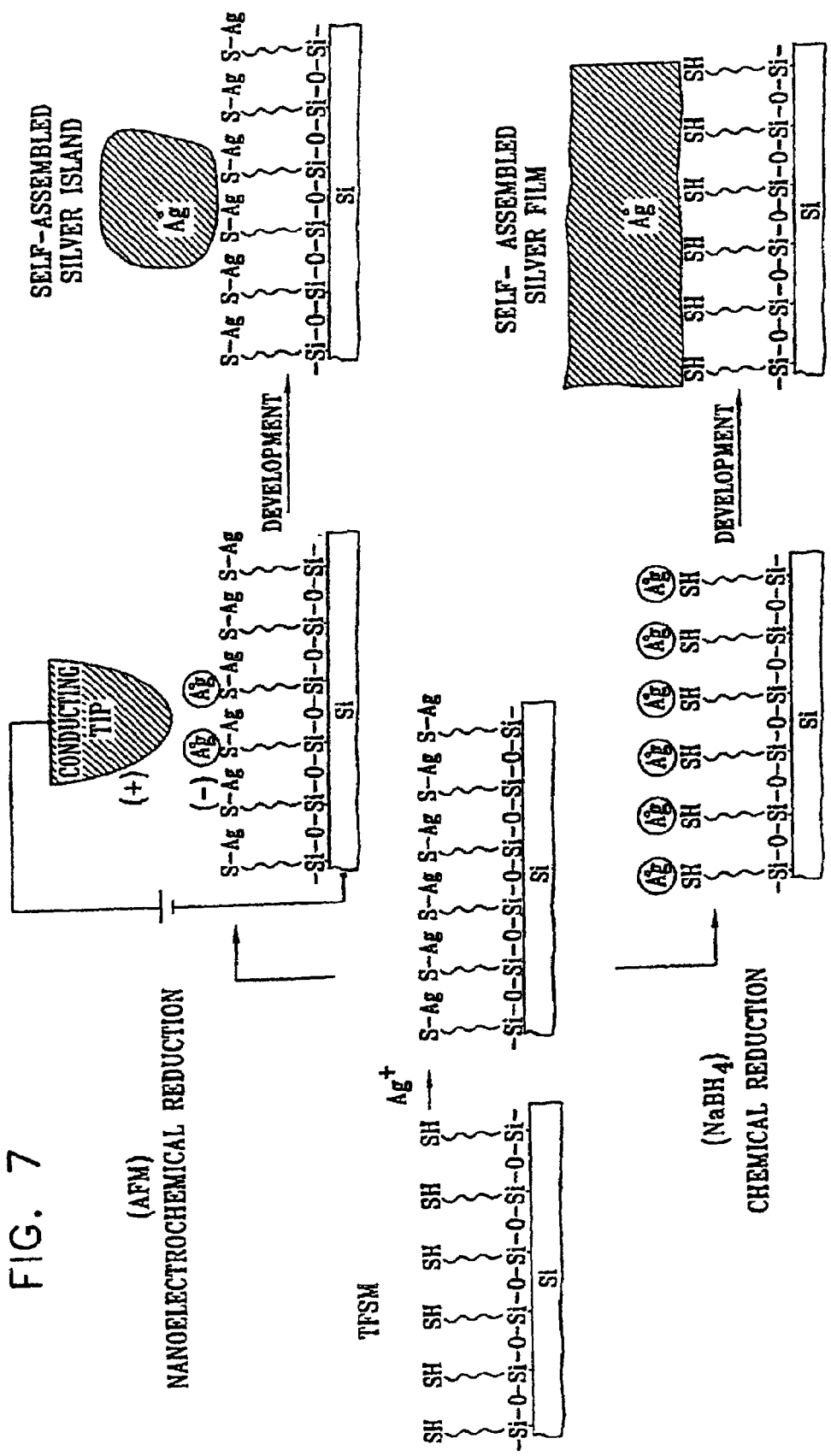
FIG. 7 depicts a scheme of the site-defined self-assembly of silver metal on a thiol-top-functionalized silane monolayer (TFSM) preassembled on silicon. The silver-thiolate (—S—Ag) template surface obtained by the chemisorption of $Ag^+$ ions on the TFSM surface (left side) is non-destructively patterned using either a wet chemical reduction process (lower path) or a nanoelectrochemical process (upper path) involving the application of a DC voltage to a conducting AFM tip (see Experimental), the slightly conducting silicon substrate being biased negatively (reductive bias) with respect to the tip. Further development of the macro- and, respectively, nano-patterns of reduced silver particles imprinted on the $Ag^+$-TFSM template is shown to result in a thicker self-assembled silver film (lower path), or self-assembled silver islands selectively grown at tip-defined sites (upper path).
Figure 10:
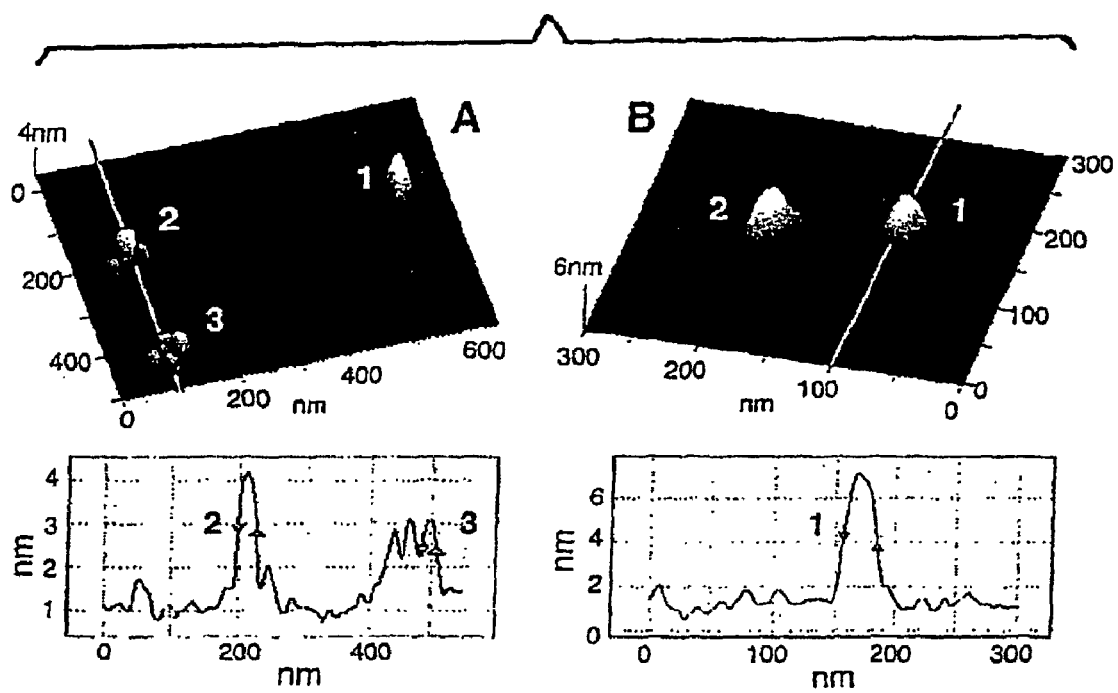
FIG. 10 shows intermittent contact images (NT-MDT P47 instrument) of silver nanoparticles generated by tip-induced nanoelectrochemical patterning (according to FIG. 7, upper path without development) of a $Ag^+$-TFSM template as that of FIG. 8. The two images, A and B, consist of three and respectively two discrete point features inscribed on the same monolayer surface, but with two different tips. The pattern inscription was done (in the contact mode) with reductive biases of 5-8V between surface and tip and pulse lengths of 40-150 ms applied at each inscribed point. Characteristic particle dimensions are evident in the distance-height profiles (along the marked lines) shown below each image.

The pattern inscription and imaging of the features shown in FIG. 10 were done on a NT-MDT P47 instrument. Probes were conductive $W_2C$-coated silicon tips (Silicon-MDT) with normal spring constants of 0.5-2 N/m, resonance frequencies of 60-180 Khz, and Q of 80-140 These characteristics allowed using the same probe in both contact and intermittent contact modes. The former was used for pattern inscription, and the latter (without electrical bias) for imaging. Lateral smearing of the deposited metal was occasionally observed during AFM imaging in the contact mode, because of the strong lateral forces exerted by the tip in this mode. This effect was particularly detrimental in the imaging of the small particles generated during the initial nanoelectrochemical reduction step (FIG. 7, upper path). In order to obtain satisfactory images it was necessary to switch from the contact mode used in pattern inscription to imaging in the intermittent contact mode. This could be conveniently accomplished with an NT-MDT P47 instrument (see FIG. 10) purchased toward the final stages of the work described herein. Pattern inscription was carried out using the system software which allows defining a dwell time and voltage bias for each point of the pattern. In order to produce small feature size, the features were written as single points. This could be done by holding the sample at ground potential and applying a positive pulse to the tip, or holding the tip at ground potential and applying a negative pulse to the sample Except where otherwise mentioned, the entire AFM patterning and imaging work was done under normal ambient conditions (23-25° C., 50%-60% relative humidity).

For the wet chemical $Ag^+$ reduction (FIGS. 7-9), drops of a $10^{-2}M$ aqueous solution of $NaBH_4$ were placed on the $Ag^+$-TFSM surface for ca. 2 min. then removed and the surface rinsed with drops of pure water. The development of the silver grains generated in the initial $Ag^+$ reduction step was accomplished with a commercial silver enhancer solution (Sigma. Silver Enhancer Kit) which was further diluted with pure water when lower metal deposition rates were desired. Drops of the enhancer solution were placed on the template surface for the specified periods of time, then removed and the surface rinsed with drops of pure water. The removal of the drops was done by suction with a sharp pipette without any visible traces of liquid being left on the surface, due to the relatively high hydrophobicity of the TFSM surface. Thus, the water contact angles characteristic of TFSMs obtained from mixed precursor monolayers with a molar ratio NTS/OTS=1/2 vary from ca. 70°(adv.) and 64° (rec.) on the silver-free surface, to ca. 67° (adv.; rec.) on the surface fully loaded with $Ag^+$ ions.

The post-patterning chemical modification and self-assembly operations involving liquid reagents were done with drops of the desired solution being placed on the patterned monolayer surface (without removing the sample from the microscope stage), followed by drops of a suitable rinsing solvent. For the self-assembly of the NTS overlayer (FIGS. 1, 4-6), a drop of water was first placed on the surface for ca. 2 min. then a drop of a 5 mM solution of NTS in BCH (for ca. 2 min), and final rinse with two drops of pure BCH followed by two drops of decalin, the NTS adsorption and the solvent rinses being repeated twice. Since none of the liquids employed wet the OTS monolayer, removal of the drops was simply done by suction, without any visible traces of material being left on the surface.

For the conversion of NTS to TFSM, the sample was irradiated (Hg lamp, $\lambda$=254 nm) for 10 min in a $H_2S/Ar$ (1:1) atmosphere, then rinsed with pure argon and finally twice sonicated (for ca. 15 s each) in pure toluene. Both the NTS and TFSM overlayers successfully withstand Scotch tape peeling, which was routinely applied in order to improve the AFM images by removal of adventitious contamination from the surface. For the formation of CdS, the TFSM surface was loaded with $Cd^2$ ions from a 1 mM solution of cadmium acetate in water (2 min adsorption, followed by rinse with two drops of pure water) and then exposed for 10 min to the same $H_2S/Ar$ atmosphere (without irradiation) followed by the argon rinse. The deposition of silver from the silver enhancer (SE) solution was done after treatment of the TFSM surface with $HAuCl_4$, as described in FIG. 4.

Example 1

In-situ Surface Generation of Organic (Insulator), Metal, and Semiconductor Nanocomponents, at Predefined Surface Sites on a Patterned OTS Monolayer.

Figure 2:
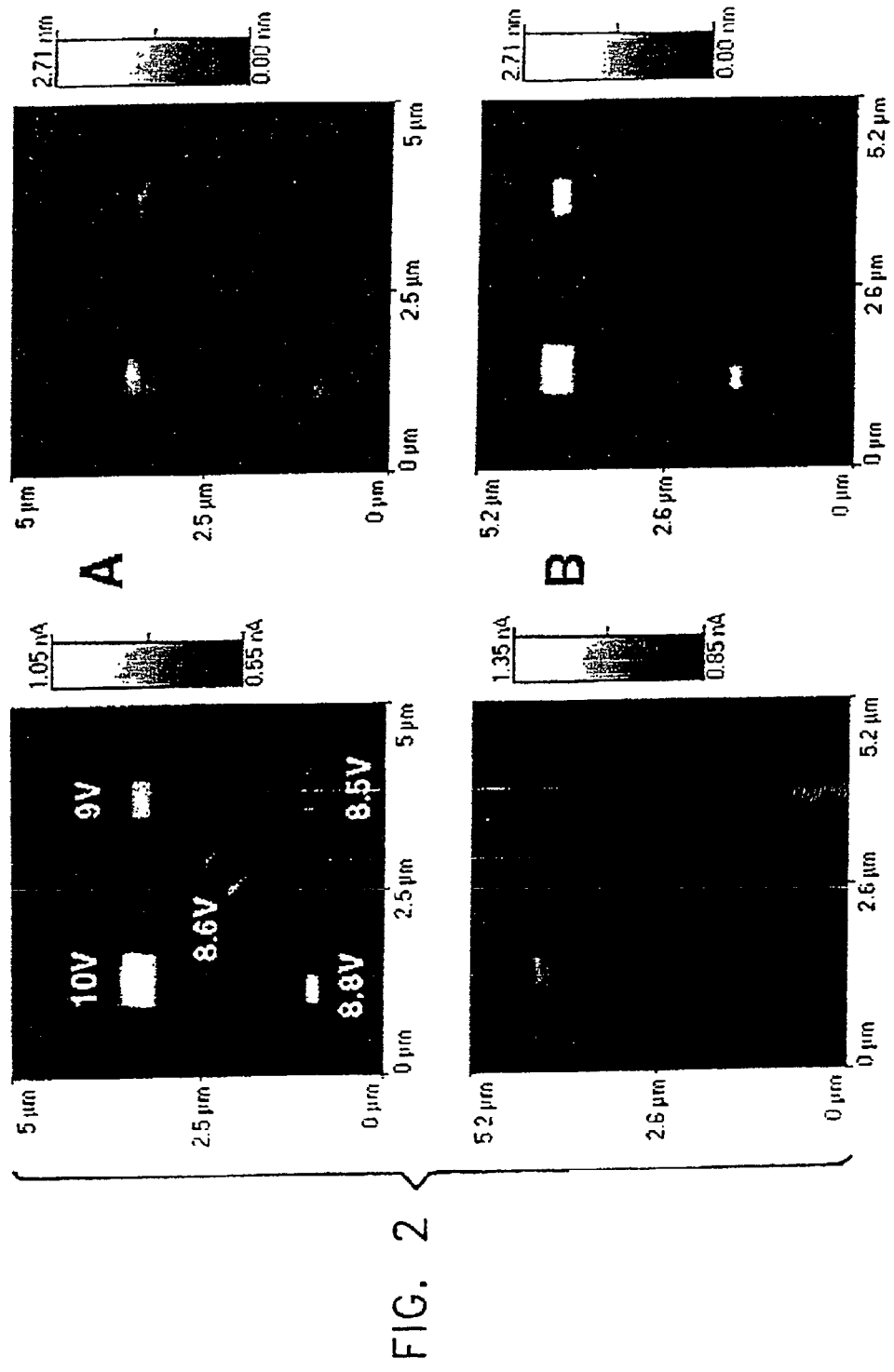
FIG. 2 shows simultaneously recorded friction and topography contact mode AFM images demonstrating three distinct modes of nanoelectrochemical pattern formation in a self-assembled OTS monolayer on silicon, as function of the bias voltage applied between surface and tip: A) after pattern inscription, and B) after treatment of the patterned surface with a 5 mM solution of OTS in bicyclohexyl (BCH). Non-destructive patterning gives rise to features initially characterized by high friction contrast and low topography contrast (in A), the contrast being reversed (as with the 9V and 8.8V rectangles) on proceeding from A to B.

FIG. 1 depicts several different self-assembly and chemical modification paths suitable for in-situ surface generation of organic (insulator), metal, and semiconductor nanocomponents, at surface sites predefined by an initial tip-inscribed oxidation pattern on OTS (OTSeo). These particular examples were selected considering the proven feasibility of each of the separate steps (Maoz et al., 1999, 1995; Wasserman et al., 1989) making up the six routes indicated, however, many other post-patterning build-up routes are obviously conceivable, including various combinations of those shown here.

Example 1a

The modifications induced by the AFM tip in tie investigated OTS/Si monolayers were found to depend on the applied bias and the ambient relative humidity. As a rule, higher bias voltages were required the lower the humidity. At constant humidity, three bias levels could be reproducibly identified giving rise to three distinct modes of pattern formation. In the examples shown in FIG. 2 the features produced with +9V and +8.8V surface biases (relative to the tip) are seen to give rise to pronounced friction contrast, with only faint changes in topography (2A), the situation being reversed after exposure of the sample to a solution of OTS (2B). This strongly suggests that only the outer surface of the OTS monolayer is affected under these conditions, the exposure to the OTS solution resulting in the self-assembly of a top OTS monolayer at polar surface sites produced by electrochemical oxidation of —$CH_3$ groups under the biased tip. At a bias of +10V, a distinct topographic spot becomes visible (2A, right), besides the marked change in surface friction (2A, left) which remains partially visible after the exposure to the OTS solution (2B, left). This would suggest that excessive bias might induce, in addition to the oxidation of the top methyls, underlayer growth of silicon oxide. with possible structural damage of the organic monolayer. Attempts to non-destructively pattern a silane monolayer with a single carbon atom tail (MTS, methyltrichlorosilane) have invariably resulted in patterns showing both friction and topography contrast, within the entire voltage range giving rise to observable images. This is consistent with past reports of the utilization of some short tail silane monolayers as ultrathin resists for destructive tip-induced patterning of silicon and other materials (Sugimura et al., 1996), which would suggest that non-destructive patterning may be possible only with compact organic films above a certain critical thickness.

Finally, at surface biases between +8.5 and +8.6V, the faint contrast visible upon patterning only in the friction mode (2A) disappears completely from both images following the OTS treatment (2B), thus suggesting that OTS molecules from solution apparently replace debonded monolayer molecules at the tip-affected sites rather than self-assembling as a top monolayer. This may occur as a result of tip-induced cleavage of the siloxane bonds responsible for interlayer and layer-to-surface bonding, without oxidation of the top methyl groups. Debonding of OTS molecules may be expected to lead to higher friction in affected monolayer regions, as the enhanced "liquid-like" character of debonded tails would give rise to an enhanced viscous drag opposing the motion of the tip.

The occurrence of such surface-solution exchange was confirmed by treating OTS monolayers patterned in this mode with a solution of the vinyl-terminated silane NTS (see FIG. 1), instead of OTS, followed by exposure to aqueous $KMnO_4$. The permanganate treatment resulted in the reappearance (in the friction image only) of the tip-inscribed features, thus providing direct evidence for the oxidation of the top vinyl groups of NTS molecules (Maoz et al., 1999) in the exchanged areas of the monolayer. Following these observations, all patterning work for constructive nanolithography was executed under bias conditions affecting the top surface of the patterned monolayer only (i.e. non-destructive patterning regime), without significant underlayer growth of silicon oxide or loss of monolayer molecules from the tip-inscribed sites (as the 9V and 8.8V features in FIG. 2). Patterns inscribed on OTS monolayers in this manner were stable for months under ambient conditions while heating at 100° C. in air for ca one hour resulted in some further enhancement of the friction contrast between the affected and unaffected surface regions, without, however, causing any observable deterioration of the original pattern or appearance of topographic modifications.

Example 1b

Figure 3:
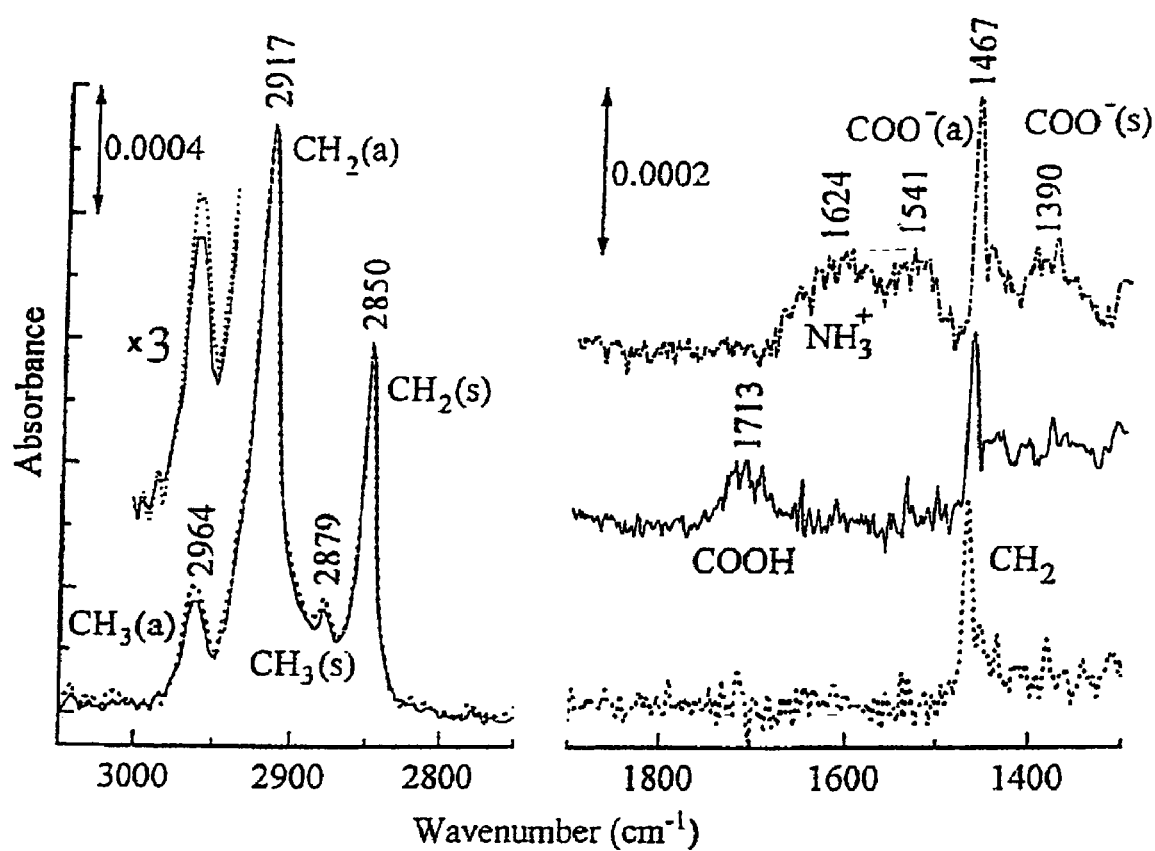
FIG. 3 shows quantitative Brewster angle FTIR spectra of: dotted line, OTS/Si monolayer self-assembled on both sides of a double-side-polished silicon wafer substrate as that of FIG. 2; full line, after contact for ca. 2 min (on each side) with a 3000 mesh copper grid to which an electrical bias (13V) was applied (the silicon substrate being positive with respect to the grid), followed by exposure to aqueous HCl (5%) for ca. 2 hours; dashed line (1900 $cm^{-1}$-1300 $cm^{-1}$ spectral region, after exposure of the acid-treated surface for ca. 0.5 min to a 50 mM solution of octadecylamine in BCH. All curves represent net spectra (4 $cm^{-1}$ resolution) of the organic coating, after mathematical subtraction of the spectral contributions of the bare Si substrate. The three-fold magnified portion of the $CH_3(a)$ band around 2964 $cm^{-1}$ and the full and dashed line curves in the 1900 $cm^{-1}$-1300 $cm^{-1}$ spectral region were shifted vertically for clarity.

The nature of the non-destructive surface modification induced by the tip was elucidated in a macro-scale simulation experiment employing, as before. (Maoz et al., 1999) a tip-mimicking copper grid (3000 mesh) pressed against the OTS/Si monolayer sample, to which a bias similar to that used in the AFM patterning was applied. The effective contact area thus established between the metal grid and the OTS monolayer was sufficiently large to allow recording meaningful Fourier transform infrared (FTIR) spectra of the modified surface sites. As can be seen in FIG. 3, no structural damage was caused to the monolayer upon application of a +13V electrical bias, the tail methylene ($CH_2$) bands at 2917 $cm^{-1}$ and 2850 $cm^{-1}$ recorded before and after the application of the electrical bias being superimposable. On the other hand, the methyl ($CH_3$) bands at 2879 $cm^{-1}$ and 2964 $cm^{-1}$ lose ca. 16% of their initial intensity (see 3× magnified inset), thus pointing to a chemical transformation involving the top surface of the monolayer only. The appearance, following acidification of a C—O stretch band at 1713 $cm^{-1}$ suggests oxidation of the top methyls to terminal COOH functions (Maoz et al., 1995). This was unequivocally confirmed by the self-assembly, on the oxidized OTS surface, of an ordered partial monolayer (ca. 20% of full monolayer coverage) of octadecylamine ($CH_3$—$(CH_2)_{17}$—$NH_2$), through the formation of ionic ammonium carboxylate interlayer linkages (as evidenced by the appearance of characteristic $NH_3^-$ and $COO^-$ features at 1624 $cm^{-1}$ and 1541 $cm^{-1}$, 1390 $cm^{-1}$, respectively. (Maoz et al., 1998; Jones et al., 1987) and the concomitant disappearance of the 1713 $cm^{-1}$ COOH band. For clarity, the octadecylamine contributions to the —$CH_2$— and —$CH_3$— bands around 2900 $cm^{-1}$ were omitted in FIG. 3.

The dependence of the tip-induced modification on the ambient humidity is strongly indicative of a faradaic mechanism (Forouzan and Bard. 1997), most-probably involving electrochemical generation of reactive oxygen-rich radicals at the tip—OTS interface. The overall process possibly resembles the observed oxidative degradation of organic monolayers by $OH^-$ radicals electrogenerated under a scanning electrochemical probe (Shiku and Uchida, 1997), however, the present tip-induced oxidation is remarkable in respect of its top surface specificity and apparently exclusive formation of COOH functions, besides its experimental simplicity and the nanometer-scale localization of the induced effect.

Example 1c

Once the non-destructive character and top surface specificity of the present patterning process were established, various routes become available, as indicated in FIG. 1, for planned post-patterning chemical manipulation and development. In the following, experimental evidence is provided for the actual implementation of routes 2 and 3, thus demonstrating the successful integration of wet chemical, gas phase, photochemical and catalytic processes, together with organic and inorganic self-assembly, in multistep sequences of nanofabrication on highly stable monolayer and bilayer templates produced by the present approach.

For example, FIG. 4 shows AFM "snapshots" taken after each of the four consecutive steps involved in the fabrication of an array of silver metal islands according to route 2 in FIG. 1. The triangular array of electrooxidized OTS (OTSeo) rectangles (ca. 400 nm×500 nm each) inscribed with the biased tip is clearly seen in the friction image (1, left), the corresponding topographic image (1, right) showing only a very small height increase, of 2-3 Å, possibly arising from the formation of the top COOH groups. Following the self-assembly of an NTS overlayer (2), the expected contrast reversal between friction and topography is observed, the NTS/OTSeo bilayer pattern showing up as a ca. 2.2 nm height increase in the topographic image (2, right) only. The conversion of NTS to the polar TFSM derivative, upon the photochemical addition of $H_2S$ to the terminal double bond of NTS, is marked by the reappearance (with enhanced contrast) of the tip-inscribed pattern in the friction image (3, left), as well as by a 3-5 Å further height increase in the corresponding topographic image (3, right), associated with the addition of the bulky sulfur functions. Finally, selective silver metal self-assembly on the TFSM template was achieved (4) by first forming a gold-TFSM complex, which subsequently catalyzes the deposition of the metal from a silver enhancer (SE) solution.

Reproducible topographic images of the metal islands were obtained in the intermittent-contact mode (4), following initial attempts of contact mode imaging which suffered from lateral smearing as a result of the relatively high shear forces exerted by the tip. Except for the damage caused in the contact mode imaging, the silver islands produced (ca. 50 nm height) are seen to faithfully follow the triangular array of rectangles initially inscribed with the tip. This confirms the successful implementation (according to route 2 of FIG. 1) of three consecutive post-patterning chemical manipulation steps, involving the site-selective self-assembly of an organic overlayer, the selective photochemical modification of the overlayer outer surface, and the final utilization of the modified surface as template for the control of the surface self-assembly of a metal, the entire multistep process being carried out with very good structural conservation of both the modified and unmodified portions of the patterned OTS monolayer as well as of the organic overlayer self-assembled at the tip-inscribed sites.

Example 1d

In FIGS. 5-6 we show examples of particulate cadmium sulfide features produced according to route 3 in FIG. 1. Unlike the deposition of silver from the silver enhancer solution, the total amount of CdS generated in this process is controlled by the finite $Cd^{2+}$ binding capacity of the TFSM template. Upon exposure of the $Cd^{2+}$-TFSM to $H_2S$, the free TFSM template is regenerated and so can be reused as a $Cd^{2+}$ binder. Thus it becomes possible to repeatedly deposit CdS, in a cyclic. template-controlled process consisting of $Cd^{2+}$ adsorption on the TFSM surface, followed by exposure to $H_2S$. FIG. 5 shows two TFSM/OTSeo template lines (ca. 2,400 nm×60-100 nm each) before (top, left) and after two and seven such cycles of cadmium sulfide self-assembly (2×CdS and 7×CdS, respectively). Accumulation and growth of CdS particles on the TFSM surface is evident from a comparison of the 2×CdS and 7×CdS images, the latter displaying aggregates of coalesced particles aligned along the TFSM template lines. An inspection of the magnified top and side views (bottom images) of the marked line segment in the 2×CdS image reveals discrete particles with heights below 3 nm and lateral dimensions below 30 nm, i.e. significantly smaller than the width (ca. 90 nm) of the template line itself. This is a desirable consequence of the self-assembly of a 3D object on a laterally confined 2D template that can supply only a limited amount of template-bound precursor species ($Cd^{2+}$ ions) during the self-assembly process. Thus, properly designed monolayer templates could be used to control the dimensions of self-assembled semiconductor and metal surface features below the actual size of the writing tip.

Other special self-assembly effects arising from such lateral confinement can be expected, as suggested by the peculiar formation of cadmium sulfide "bowls" (FIG. 6) due to preferential nucleation and growth of CdS particles at the periphery of TFSM/OTSeo template domains with certain characteristic lateral dimensions. The good structural preservation of both the OTS base monolayer and the top-assembled organic template is evident here. like in FIGS. 4-5, from the high fidelity of the step-to-step pattern transfer, no structural defects being identified in images of the same surface region recorded at different consecutive stages during the fabrication process.

In conclusion, while the mechanism of the tip-induced electrooxidation of terminal methyls in monolayer systems of the kind presently studied remains to be elucidated, the results obtained convincingly demonstrate the successful utilization of such "inert" monolayers as extremely versatile base templates in constructive nanolithography. This paves the way for a more thorough investigation of the synthetic potential of this promising new nanofabrication approach, toward its eventual application in the development of novel ultrahigh-density data storage media and surface self-assembled electronic circuits of nanometer dimensions.

Example 2

Site-defined Silver Metal Self-assembly on a Patterned Monolayer Template

Starting with a thiol-top-functionalized silane monolayer (TFSM) with silver ions chiemisorbed on its outer surface ($Ag^+$-TFSM) metallic silver nanoparticles are generated at selected surface sites by either wet chemical or tip-induced electrochemical reduction of the surface-bound metal ions. As illustrated in FIG. 7, the conventional wet chemical reduction (e.g. with aqueous $NaBH_4$) can be used to cover macroscopic surface areas, with lateral dimensions between ca. 0.5 millimeter (micropipette delivery may allow targeting of the reducing solution to sub-micron surface areas) to several centimeters, whereas site-defined reduction of the silver thiolate in the micron down to the nanometer-size range can be achieved with the help of a conducting AFM tip.

If desired, larger metal islands and thicker films, useful as electrical contacts and current leads, may be grown by further chemical development of the initially generated silver particles (FIG. 7). Thus, silver metal structures are assembled according to a predefined design, by non-destructively imprinting chemical information on the outer surface of a stable, solid supported organic monolayer that performs the function of an active template for spatial control of the metal self-assembly. As in the site-defined bilayer self-assembly demonstrated before (Maoz et al., 1999), once an initial pattern is inscribed on the outer surface of the base monolayer template, all subsequent operations leading to the final desired surface structure consist of in situ chemical modifications and self-assembly processes only, the monolayer template being preserved as an integral part of the resulting final structure. Thus, unlike lithographic methods based on resist removal and etch pattern-transfer technologies (See, for example, Mino et al., 1994; Lercel et al., 1996; Thywissen et al., 1997; Xia et al., 1998; Perkins et al., 1994; Schoer et al., 1994; Sugimura et al., 1996; Tully et al., 1999) constructive nanolithography takes advantage of surface self-assembly processes that, by their very nature, hold promise for attractive new developments in nanofabrication, both in terms of the combined chemical-architectural diversity they offer and ultimate achievable miniaturization, beyond the inherent limits of the primary pattern inscription step. For example, processes of spatially-confined self-assembly can be utilized to generate monolayer-bound metal particles (at tip-inscribed sites) significantly smaller than the effective size of the AFM tip used for patterning, as shown below.

Example 2a

Densely packed, defect-free TFSMs with variable surface concentrations of sulfur were produced photochemically from high quality NTS precursor monolayers (NTS, 18-nonadecenyltrichlorosilane, $CH_2=CH-(CH_2)_{17}-SiCl_3$) (Maoz et al., 1999) and NTS+OTS mixed monolayers (OTS, n-octadecyltrichlorosilane, $CH_3-(CH_2)_{17}-SiCl_3$) self-assembled on slightly conducting silicon wafer substrates (see Experimental). Most of the present work was done on mixed monolayers with a molar ratio NTS/OTS=1/2, which combine two desirable properties; a sufficiently large surface density of the sulfur-containing functions (generated from the terminal vinyl groups of NTS), together with enhanced surface hydrophobicity (due to the large percentage of outer $-CH_3$ groups contributed by OTS). The relatively high hydrophobicity of such monolayers permits easy handling of the wet chemical surface treatments and facilitates lateral confinement of the chemical reduction process, by the use of well defined non-spreading droplets of the liquid reagents. In situ top-functionalized monolayers obtained by this method usually expose both thiol and disulfide surface functions, the formation of the latter depending on the packing density of the top vinyl groups in the precursor monolayer. Considering the comparable silver-bindinig performance of the thiol and the disulfide, no attempt was made to deliberately control the exact content of these functions in the different sulfur-containing monolayers examined during this experiment. Disulfide surface functions obtained as the primary main product of the photo-induced reaction of $H_2S$ with pure NTS monolayers (see Experimental) may subsequently be converted to thiol groups by chemical reduction with a suitable reducing reagent.

For brevity, we use here the tern TFSM in a general sense, although the actual percentage of thiol groups in different TFSMs may thus vary, depending on the NTS/OTS molar ratios of the respective precursor monolayers.

The formation of nanoparticles of metallic silver+ free thiol groups upon the wet chemical reduction of silver-thiolate monolayer surface groups (carried out over macroscopic surface areas; FIG. 7, lower path) was confirmed by UV-vis spectroscopy, X-ray photoelectron spectroscopy (XPS) and AFM imaging, while the structural stability of the template monolayers was routinely checked by taking quantitative Fourier transform infrared (FTIR) spectra of the investigated samples before and after each of the chemical operations indicated in FIG. 7. Silver nanoparticles generated by such wet chemical reduction of $Ag^+$-TFSM surfaces could be further developed (FIG. 7) using a silver self-assembly process that takes place exclusively around preformed silver metal nuclei, while being practically inactive at surface sites exposing unreduced silver ions only. In this manner, once a pattern of reduced silver is generated, further chemical deposition of silver metal would selectively amplify it thus resulting in effective development of the initially inscribed chemical information (FIG. 7). This was realized by the application of a metal-catalyzed silver enhancer solution which deposits silver only on metal-seeded sites (Braun et al., 1998). The rate of deposition and total amount of deposited silver were controlled by a number of adjustable parameters, such as the concentration of the enhancer solution and the time of contact with the activated surface (see FIGS. 8, 9). The selective development of silver metal grains upon treatment with the enhancer solution could thus be used as a sensitive indicator of the presence and location of reduced silver on the treated surface. This property was fully exploited in the nanoelectrochemical patterning experiments described in the following, for an unequivocal identification of tip-generated silver particles and their differentiation from grainy features originating in adventitious surface contamination that may also show up in the AFM images.

Example 2b

Using wet chemical reduction (FIG. 7, lower path), millimeter-size conducting silver electrodes could be produced within minutes on $Ag^+$-TFSM surfaces by a very simple procedure consisting of sequential placement and removal (with a pipette) of small drops of the reducing solution, pure water, the silver enhancer solution, and again pure water (see Experimental). The silver metal deposition was found to be well defined by the position and size of each reducing drop, no metal film formation being observed outside the circumference of the corresponding reduced surface spots (see below). The chemical and nanoelectrochemical processes (FIG. 7, lower and upper paths, respectively) can be easily combined, which may be particularly useful for the fabrication of electrical contacts between the macroscopic world and a self-assembled nanocircuit. This is demonstrated, for example, by the successful tip-induced generation of two silver islands at preselected surface sites near the edge of a conducting silver electrode fabricated by the wet chemical procedure described above (FIG. 8). It is of interest to note in FIG. 8 the sharp edge of the electrode and the fact that silver metal was selectively deposited only within those areas of the $Ag^+$-TFSM template that were either exposed to the chemical reducing reagent or scanned with the tip under appropriate reductive bias prior to the application of the enhancer solution, despite the presence of $Ag^+$ ions on the entire imaged surface. This points to the equivalence of the chemical and tip-induced processes, the formation of reduced silver grains being effectively confined to those surface sites deliberately marked with the biased tip during the initial patterning step.

Example 2c

For many applications, it would be advantageous to be able to sequentially add new elements to a growing nanostructure, while continuously monitoring the entire build-up process with the help of a non-destructive inspection tool. Constructive nanolithography offers this option, as illustrated by the site-defined self-assembly, in six separate steps, of an array of nine silver islands (FIG. 9), using the nanoelectrochemical reduction and development process depicted in FIG. 7. In the example given in FIG. 9, individual islands as well as a pair of islands (step 4) were added sequentially to an initial set of three islands, the resulting structure being in situ imaged (with the same conductive diamond tip used for patterning) before and after each of the operations involved in its construction. To demonstrate the flexibility of this self-assembly approach, the last added two islands (steps 5 and 6) were intentionally made much smaller than the first seven, with heights below 50 nm and lateral dimensions below ca. 0.4 µm. The successful implementation of such a sequence of site-defined metal deposition steps is obviously a consequence of the fact that no silver metal is deposited in the absence of intentional site activation by the tip, again pointing to the formation of metallic grains upon the reduction of surface-bound silver ions under the tip.

Example 2d

Examples of AFM images of primary (undeveloped) metal particles, generated by tip-induced nanoelectrochemical reduction of TFSM-bound silver ions, are given in FIGS. 10A-10B. FIG. 10A shows clusters of nanoparticles with typical heights of 2-3 nm and lateral dimensions of the individual particles between 20-30 nm, while in FIG. 10B one can see isolated particles with heights of 5-6 nm and lateral dimensions of ca. 30 nm. Since these point features, in 10A and 10B, were produced on the same monolayer surface, but with different tips (also used for imaging), the resulting particles most probably reflect the interplay between tip size and shape because of the convolution with the tip, the measured lateral dimensions of the particles may be overestimated) and the nucleation and growth kinetics of metal crystallites following the reduction of silver ions present within surface domains affected by the tip. It is thus interesting to note the formation of clustered metal particles, each particle having lateral dimensions 4-5 times smaller than those of the cluster itself (e.g. #3 in image 10A), i.e. significantly smaller than the overall size of the tip-affected domain.

Example 2e

By analogy with the wet chemical reduction process, the selective deposition of silver metal from the silver enhancer solution at the tip-inscribed surface sites strongly suggests that, under the conditions of these experiments, the tip-induced transformation indeed involves local electrochemical reduction of the surface-bound $Ag^+$ ions to elemental silver. This view is confirmed by the results of a series of additional experiments, briefly summarized in the following, which provide further insight into the mechanism of the tip-induced $Ag^+$ reduction as well as into other possible modes of constructive nanolithography:

Upon treatment with the silver enhancer solution, no development was observed after the $Ag^+$-TFSM surface was scanned with a conducting diamond tip under reverse bias (i.e. tip negative, Si substrate positive). Likewise, a pattern "written" with a positively biased tip and then "rewritten" with the same tip negatively biased could not be developed. This implies that elemental silver generated in the reductive scanning mode undergoes oxidation when the same scan is repeated in the oxidative mode. Scanning again the same area in the reductive mode (tip positive) enabled development, which implies reversibility of the oxidation process.

No development was found to occur when $Ag^+$-TFSM surfaces were scanned in an atmosphere of dry nitrogen, irrespective of the bias applied to the diamond tip. This clearly indicates that the tip-induced reduction of $Ag^+$-TFSMs, like the previously reported tip-induced oxidation of NTS monolayers (maoz et al., 1999), is a water-mediated faradaic process (Forouzan and Bard, 1997) in which atmospheric water vapor condensing at the tip (Piner and Mirkin, 1997) plays an essential role (Sugimura and Nakagiri, 1997). The formation of elemental silver conceivably involves electrochemical reduction at the $Ag^+$-TFSM surface (cathode) and oxidation of water at the tip (anode);

Surface (negative): $4R\text{---}S^-Ag^++4e^-+4H_2O \rightarrow 4R\text{---}SH+4Ag^O+4OH^-$ Tip (positive): $2H_2O \rightarrow O_2+4H^++4e^-$ Overall process: $4R\text{---}S^-Ag^++2H_2O \rightarrow 4R\text{---}SH+4Ag^O+O_2$ No deposition of silver from the silver enhancer solution was observed on a monolayer of OTS/Si or on bare silicon (after scanning with the diamond tip in the reductive mode), which confirms that no spurious surface processes, unrelated to the template-bound $Ag^+$ ions, could be responsible for the observed effects.

Finally, rather intriguing results were obtained when, in an attempt to locally deliver $Ag^+$ ions to a silver-free TFSM surface, the diamond-coated silicon tip was replaced with a silver-coated silicon nitride tip. In air, the reductive scanning mode (tip positive) produced a pattern which could not, however, be developed with the silver enhancer solution. On the other hand, development occurred when the reductive scannings was done under dry nitrogen. No effect was observed, either in air or in the dry nitrogen atmosphere, when the TFSM was scanned under reverse bias (tip negative) or without electrical bias. These observations can be rationalized if we assume that in humid air the positively biased silver tip (anode) is oxidized (Forouzan and Bard, 1997) and silver oxide or hydroxide particles rather than $Ag^+$ ions are released to the TFSM surface (cathode), where water is reduced;

Tip (positive): $2Ag^O+H_2O \rightarrow Ag_2O+2H^++2e^-$

Surface (negative): $2H_2O+2e^- \rightarrow H_2+2OH^-$

Overall process: $2Ag^O+H_2O \rightarrow Ag_2O+H_2$

In dry nitrogen, a water-free electrochemical process occurs, whereby $Ag^+$ ions generated at the positive silver tip adsorb on the negative TFSM surface, where further rapid reduction to elemental silver occurs;

Tip (positive): $Ag^O \rightarrow Ag^++e^-$

Surface (negative): $R\text{---}SH+Ag^++e^- \rightarrow R\text{---}SH+Ag^O$

Overall process: Transfer of $Ag^O$ from tip to surface.

Taken together, the combined results of the present described "macro-" and "micro-size" experiments provide conclusive evidence for the feasibility of site-defined self-assembly of silver metal on both chemically and nanoelectrochemically patterned monolayer templates with sulfur-containing outer groups. Two modes of non-destructive patterning with electrically biased AFM tips were examined, both of which generate an initial, template-stabilized pattern of elemental silver grains, which can be further developed by treatment of the surface with a silver enhancer solution. In one mode, $Ag^+$ ions bound to the surface of the template are locally reduced with a silver-free conductive tip operating in normal ambient conditions, whereas in the second mode, elemental silver is locally transferred from a silver-coated tip to a silver-free template surface scanned under dry nitrogen. The available evidence suggests that a water-mediated faradaic mechanism is, most probably, operative in the first mode, whereas the second mode involves a dry electrochemical process facilitated by the direct contact between oppositely biased tip and template. The net result of the latter process may thus be regarded as representing electrically-driven transport of silver metal from the tip to a stable, silver-binding monolayer surface, the tip acting here as a nanometric solid-state "fountain-pen" that delivers a solid "ink" (silver metal) to a "paper" consisting of a functional surface with chemical affinity for this particular "ink". An analogous "inverted" process, referred to as "dip-pen" nanolithography, was recently reported, whereby a molecular "ink" made of monolayer-forming thiol molecules is mechanically delivered from a "ink-loaded" AFM tip acting as "pen" to a solid gold surface acting as "paper" (Piner et al., 1999).

In conclusion, proof-of-concept experiments have been carried out demonstrating the possible utilization of constructive nanolithography as a versatile approach to the in situ chemical fabrication of spatially defined metal structures on organic monolayer templates. It was further shown that a simple change of experimental conditions, involving the tip material, the composition of the template surface, and the composition of the ambient atmosphere, may result in a different, yet useful mode of nanoelectrochemical surface patterning which points to the versatility and wide applicability of the method.

While the present proof-of-concept study was not intended to explore the limits of miniaturization achievable by the described new approach, we should emphasize that in principle, it offers attractive options for miniaturization beyond the smallest surface features that might be directly generated through the patterning process (FIG. 10A). This follows from the fact that a 3D object, such as a metal or semiconductor particle, grown from a sub-monolayer supply of surface-bound metal ions (available within a lithographically defined 2D monolayer domain with limited ion binding capacity), must necessarily be smaller than the domain itself. Relying on such processes of "laterally confined" self assembly and growth rather than on etch and removal of material, constructive nanolithography is (unlike most other lithographic schemes) intrinsically adapted to transcend the limits of miniaturization inherent in the primary patterning process itself. This aspect holds great promise for a series of applications, particularly in nanoelectronics (Ahmed, 1997) that are critically dependent on the ability to assemble and address complex functional structures with precisely defined nanometric dimensions.

REFERENCES

1. H. Ahmed, *J. Vac. Sci. Technol. B* 1997, 15, 2101.
2. E. Braun, Y. Eichen, U. Sivan, G. Ben-Yoseph, *Nature* 1998, 391, 775.
3. F. Forouzan, A. J. Bard, *J. Phys. Chem. B* 1997, 101, 10876.
4. C. A. Jones, M. C. Petty, G. G. Roberts, G. Davies, J. Yarwood, N. M. Ratcliffe, J. W. Barton, *Thin Solid Films* 1987, 155, 187.
5. M. J. Lercel, H. G. Craighead, A. N. Parikh, K. Seshadri, D. L. Allara, *Appl. Phys. Lett.* 1996, 68, 1504.
6. R. Maoz, J. Sagiv, D. Degenhardt, H. Möhwald, P. Quint, *Supramol. Sci.* 1995, 2, 9.
7. R. Maoz, H. Cohen, J. Sagiv, *Langmuir* 1998, 14, 5988.
8. R. Maoz, S. R. Cohen, J. Sagiv, *Adv. Mater.* 1999, 11, 55.
9. N. Mino, S. Ozaki, K. Ogawa, M. Hatada, *Thin Solid Films* 1994, 243, 374.
10. F. K. Perkins, E. Dobisz, S. L. Brandow, T. S. Koloski, J. M. Calvert, K. W. Rhee, J. E. Kosakowski, C. R. K. Marrian, *J. Vac. Sci. Technol. B* 1994, 12, 3725.
11. R. D. Piner, C. A. Mirkin, *Langmuir* 1997, 13, 6864.
12. R. D. Piner, J. Zhu, F. Xu, S. Hong, C. A. Mirkin, *Science*, 1999, 283, 661.
13. J. K. Schoer, C. B. Ross, R. M. Crooks, T. S. Corbitt, M. J. Hampden-Smith, *Langmuir* 1994, 10, 615.
14. H. Shiku, I. Uchida, T. Matsue, *Langmuir* 1997, 13, 7239.
15. H. Sugimura, N. Nakagiri, *J. Vac. Sci. Technol. B* 1996, 14, 1223.

16. H. Sugimura, K. Okiguchi, N. Nakagiri, M. Miyashita, *J. Vac. Sci. Technol. B* 1996, 14, 4140.
17. J. H. Thywissen, K. S. Johnson, R. Younkin, N. H. Dekker, K. K. Berggren, A. P. Chu, M. Prentiss, S. A. Lee, *J. Vac. Sci. Technol. B* 1997, 15, 2093.
18. D. C. Tully, K. Wilder, J. M. J. Fréchet, A. R. Trimble, C. F. Quate, *Adv. Mater.* 1999, 11, 314.
19. S. R. Wasserman, Y.-T. Tao, G. M. Whitesides, *Langmuir* 1989, 5, 1074
20. Y. Xia, G. M. Whitesides, *Angew. Chem. Int. Ed.* 1998, 37, 550.

The invention claimed is:

1. A patterned organic monolayer film self-assembled on a solid substrate, the pattern comprising a site-defined surface chemical modification non-destructively inscribed on the organic monolayer film by a site-defined application of electrical bias, wherein the monolayer film is composed of an organosilane compound, the top surface functionality of which is not vinyl terminated.

2. A patterned organic film self-assembled on a solid substrate, wherein the organic film is composed of one or more organic layers built on top of an organic base monolayer, and the pattern comprises a site-defined surface chemical modification non-destructively inscribed on the base monolayer and/or on the organic film by a site-defined application of electrical bias, wherein, if the pattern is inscribed on said base monolayer and said base monolayer is composed of an organosilane compound, the top surface functionality of said organosilane base monolayer is not vinyl terminated.

3. The patterned organic film according to claim 1 or claim 2, wherein the solid substrate is an electrically conducting solid substrate.

4. The patterned organic film according to claim 3, wherein the electrically conducting solid substrate is silicon.

5. The patterned organic film according to claim 1 or claim 2, wherein said pattern comprises one or more further derivatizations of said site-defined surface chemical modification non-destructively inscribed on the organic film by the said application of an electrical bias.

6. Ultra-high density storage media of nanometer dimensions comprising a patterned organic film according to claim 1 or claim 2.

7. Ultra-high density surface self-assembled electronic circuits of nanometer dimensions comprising a patterned organic film according to claim 1 or claim 2.

8. In the production of submicron electronic circuits and devices, the improvement comprising incorporating a patterned organic film according to claim 1 or claim 2 in the electronic circuits and devices.

9. A patterned organic monolayer film according to claim 1, wherein said organic monolayer film is obtained by the self-assembly on the substrate of a precursor compound of the formula R'—Si—RRR, wherein each R is the same or different, each R is halogen, lower alkyl, hydroxyl or lower alkoxy, and R' is $C_1$-$C_{30}$ alkyl, partially or fully fluorinated $C_1$-$C_{30}$ alkyl, aryl, cycloalkyl, polycycloalkyl, $C_1$-$C_{30}$ alkenyl, or any of such alkyl and alkenyl radicals interrupted by a cycloalkyl or aryl group, or by a heteroatom selected from the group consisting of O, S and N, or by an ester (—O—CO—) or amide (—CO—NH—) group, the radical R' being substituted along the chain, terminated by a functional group, or substituted along the chain and terminated by a functional group, and wherein the top surface of the monolayer film is not vinyl terminated.

10. The patterned organic monolayer film according to claim 9, wherein said terminal functional group or an in-between functional group is selected from the group consisting of Cl, Br, OH, SH, —S—S—, CN, SCN, $NH_2$, (thio)carboxyl, COOH, $(OH)_2$—PO—O, (thio)phosphate, (thio)phosphonate, (thio)sulfate, (thio)sulfonate, (thio) carbamate, (thio) carbonate and (thio)hydroxamate.

11. The patterned organic monolayer film according to claim 10, wherein said functional group is COOH.

12. The patterned organic monolayer film according to claim 10, wherein said functional group is obtained, before introducing said patterns, by chemical modification of a monolayer obtained from a $CH_2$=CH—$(CH_2)_n$—$SiCl_3$ precursor, wherein n=0-30.

13. The patterned organic monolayer film according to claim 10, wherein said functional group is obtained, before introducing said pattern, by chemical modification of a monolayer obtained from a $CH_3$—$(CH_2)_n$—$SiCl_3$ precursor, wherein n=0-30.

14. The patterned organic monolayer film according to claim 1, wherein said organic monolayer film is obtained by the self-assembly on the substrate of a precursor methyl-terminated silane, and said site-defined surface chemical modification comprises oxidation of the top methyl groups, and, optionally, further derivatization of the oxidized top groups.

15. The patterned organic monolayer film according to claim 14, wherein said methyl-terminated silane is n-octadecyltrichlorosilane ($CH_3$—$(CH_2)_{17}$—$SiCl_3$).

16. The patterned organic monolayer film according to claim 14, wherein the site-defined surface chemical modification results in a monolayer composed of a compound of the formula HOOC—$(CH_2)_{17}$—SiRRR wherein each R is the same or different, and each R is halogen, lower alkyl, hydroxyl, or lower alkoxy.

17. The patterned organic monolayer film according to claim 14, wherein said precursor methyl-terminated silane is $CH_3$—$(CH_2)_n$—$SiCl_3$, wherein n=0-30.

18. A patterned organic multilayer film according to claim 2, wherein said multilayer film comprises one or more organic layers built on top of a base monolayer obtained from a precursor compound or a mixture of compounds of the formula R'—Si—RRR, wherein each R is the same or different and is halogen, lower alkyl, hydroxyl, or lower alkoxy, and each R' is $C_1$-$C_{30}$ alkyl or partially or fully fluorinated $C_1$-$C_{30}$ alkyl, aryl, cycloalkyl, polycycloalkyl, or $C_1$-$C_{30}$ alkenyl, or any such alkyl or alkenyl radical interrupted by a cycloalkyl or aryl group or a heteroatom selected from the group consisting of O, S and N, or an ester (—O—CO—) group or an amide (—CO—NH—) group, or any such alkyl or alkenyl radical substituted along the chain, terminated by a functional group, or substituted along the chain and terminated by a functional group.

19. A patterned organic multilayer film according to claim 18, wherein one or more organic layers, each made of a compound or a mixture of compounds of the formula R'—Si—, are built on top of a base monolayer obtained from said precursor compounds of the formula R'—Si—RRR.

20. The patterned organic multilayer film according to claim 19, wherein one or more organic layers, each made of a compound or a mixture of compounds selected from the group consisting of $CH_3$—$(CH_2)_n$—Si—, $CH_2$=CH—$(CH_2)_n$—Si—, COOH—$(CH_2)_n$—Si—, HS—$(CH_2)_n$—Si—, $H_2N$—$(CH_2)_n$—Si—, $(HO)_2$—PO—O—$(CH_2)_n$—Si—, $(HO)_2$—PS—O—$(CH_2)_n$—Si—, and $(HS)_2$—PS—O—$(CH_2)_n$—Si—, wherein n=0-30, is built on top of a base monolayer obtained from said precursor compounds of the formula R'—Si—RRR.

21. The patterned organic multilayer film according to claim 20, wherein said top organic layers of the formulas COOH—$(CH_2)_n$—Si, HS—$(CH_2)_n$—Si—, $H_2N$—$(CH_2)_n$—Si—, $(HO)_2$—PO—O—$(CH_2)_n$—Si—, $(HO)_2$—PS—O—$(CH_2)_n$—Si—, or $(HS)_2$—PS—O—$(CH_2)_n$—Si—, are obtained by the chemical modification of organic layers obtained from a vinyl-terminated silane precursor of the formula $CH_2$=CH—$(CH_2)_n$—$SiCl_3$, wherein n=0-30.

22. The patterned organic film according to claim 20, wherein n is 17.

23. The patterned organic film according to claim 21, wherein n is 17.

24. A hybrid inorganic-organic or organic-organic nanostructure composed of a material selected from the group consisting of one or more of a metal, a metal compound, silicon, a silicon compound, and a conducting polymer, said material being combined with a nanoelectrochemically patterned organic monolayer template self-assembled on a solid substrate, the pattern comprising a site-defined surface chemical modification non-destructively inscribed on the organic monolayer film by a site-defined application of electrical bias, wherein the monolayer film is composed of an organosilane compound, the top surface functionality of which is not vinyl terminated; and wherein said metal, metal compound, silicon, silicon compound, or conducting polymer is situated on top of said organic monolayer template.

25. A hybrid inorganic-organic or organic-organic nanostructure composed of a material selected from the group consisting of one or more of a metal, a metal compound, silicon, a silicon compound, and a conducting polymer, said material being combined with a nanoelectrochemically patterned organic multilayer template self-assembled on a solid substrate, said multilayer template comprising one or more organic layers built on top of a base monolayer, the pattern comprising a site-defined surface chemical modification non-destructively inscribed on the base monolayer and/or on the multilayer template by a site-defined application of electrical bias, wherein, if the pattern is inscribed on said base monolayer and said base monolayer is composed of an organosilane compound, the top surface functionality of said organosilane base monolayer is not vinyl terminated; and wherein said metal, metal compound, silicon, silicon compound, or conducting polymer is (a) situated on top of said organic multilayer template, or (b) situated in between the layers or parts of the layers of said organic multilayer template.

26. A nanostructure according to claim 24 or claim 25, wherein the solid substrate is an electrically conducting solid substrate.

27. The nanostructure according to claim 26, wherein the electrically conducting solid substrate is silicon.

28. A nanostructure according to claim 24 or claim 25, wherein said material is a metal that is a noble metal selected from the group consisting of Ag, Au, Pt, and Ir, or a metal selected from the group consisting of Cu, Pb, Ga, In, Hg, Pd, and Rh.

29. A nanostructure according to claim 18 or claim 25, wherein said material is a metal compound selected from the group consisting of one or more semiconductors consisting of a metal chalcogenide, a metal arsenide, or a mixture thereof; one or more metal oxides; a metal alloy; an organic metal; a conducting polymer; a composite of elemental metals; and a metal alloy with metal compounds, organic polymers, ceramics, or mixtures thereof.

30. The nanostructure according to claim 29, wherein the material is a metal oxide selected from the group consisting of oxides of iron, titanium, zinc, tin, silicon, and germanium.

31. A nanostructure according to claim 24, wherein the pattern on said patterned organic monolayer template comprises a site-defined chemical modification non-destructively inscribed on the surface of the organic monolayer film by a device that can touch said organic monolayer surface and inscribe thereon a chemical modification pattern upon application of an electrical bias.

32. A method for the production of a hybrid inorganic-organic or organic-organic nanostructure according to claim 24, by a template-controlled self-assembly strategy, comprising:
   (i) assembling a monolayer of an organosilane compound terminated by a methyl group, on a solid substrate;
   (ii) non-destructively patterning the said methyl-terminated monolayer of (i) by a device that can touch said organic monolayer surface and inscribe thereon a chemical modification pattern upon application of an electrical bias, thus forming the pattern by electrochemical site-defined oxidation of the terminal methyl group, and, optionally, further chemically modifying this oxidized methyl site to another functional group; and
   (iii) further generating or binding a material selected from the group consisting of one or more of a metal, a metal compound, silicon, a silicon compound, and a conducting polymer, at the modified sites of said organic monolayer of (ii), thus obtaining said nanostructure with a combination of a material selected from the group consisting of one or more of a metal, a metal compound, silicon, a silicon compound, and a conducting polymer, and a nanoelectrochemically patterned organic monolayer template self-assembled on a solid substrate.

33. A method for the production of a nanostructure according to claim 25, by a template-controlled self-assembly strategy, comprising:
   (i) assembling a monolayer of an organosilane compound terminated by a methyl group, on a solid substrate;
   (ii) non-destructively patterning the said methyl-terminated monolayer of (i) by a device that can touch said organic monolayer surface and inscribe thereon a chemical modification pattern upon application of an electrical bias, thus forming the pattern by electrochemical site-defined oxidation of the terminal methyl group, and, optionally, further chemically modifying this oxidized methyl site to another functional group;
   (iii) binding one or more organic monolayers to the modified sites of the organic monolayer obtained in (ii) above, wherein these additional monolayers are optionally terminated by a methyl or a vinyl group, and after binding each monolayer, non-destructively patterning the said organic monolayer or multilayer by a device that can touch said organic monolayer or multilayer surface and inscribe thereon a chemical modification pattern upon application of an electrical bias; and
   (iv) further generating or binding a material selected from the group consisting of one or more of a metal, a metal compound, a conducting polymer, silicon, and a silicon compound, at the modified surface sites of said organic monolayer or multilayer of (iii), thus obtaining said nanostructure with a combination of a material selected from the group consisting of one or more of a metal, a metal compound, silicon, a silicon compound, and a conducting polymer, and a nanoelectrochemically patterned layered organic template self-assembled on a solid substrate.

34. A method for the production of a nanostructure according to claim 25, by a template-controlled self-assembly strategy, comprising:
(i) assembling a monolayer of an organosilane compound terminated by a methyl group, on a solid substrate;
(ii) non-destructively patterning the said methyl-terminated monolayer of (i) by a device that can touch said organic monolayer surface and inscribe thereon a chemical modification pattern upon application of an electrical bias, thus forming the pattern by electrochemical site-defined oxidation of the terminal methyl group and, optionally, further chemically modifying this oxidized methyl site to another functional group;
(iii) binding one or more organic monolayers to the modified surface sites of the organic monolayer obtained in (ii) above, wherein each of these additional monolayers are made of the same or different compounds, optionally modified by chemical processes performed after the addition of each monolayer, after the assembly of several monolayers, or after the assembly of the entire desired multilayer; and
(iv) further generating or binding a material selected from the group consisting of one or more of a metal, a metal compound, silicon, a silicon compound, and a conducting polymer, (a) on the top of said organic monolayer, or (b) on top of said organic multilayer, or (c) in-between the layers of said organic multilayer, or (d) on top of said organic multilayer and in-between the layers of said organic multilayer, thus obtaining said nanostructure with a combination of a material selected from the group consisting of one or more of a metal, a metal compound, silicon, a silicon compound, and a conducting polymer, and a nanoelectrochemically patterned and further chemically modified layered organic template self-assembled on a solid substrate.

35. A nanostructure according to claim 25, wherein the pattern on said patterned organic multilayer template comprises a site-defined chemical modification non-destructively inscribed on the surface of the base monolayer and/or on the surface of the multilayer template by a device that can touch said base monolayer and/or said multilayer template surface and inscribe thereon a chemical modification pattern upon application of an electrical bias.

36. A method for the production of a hybrid metal-organic nanostructure by a template-controlled self-assembly strategy, comprising:
(i) assembling a monolayer of an organosilane compound terminated by a functional group on a solid substrate;
(ii) binding a metal ion to the functional group of (i); and
(iii) non-destructively patterning the top surface of said metal ion-terminated layer of (ii) by a device that can touch said organic monolayer surface and inscribe thereon a chemical modification pattern upon application of an electrical bias, thus forming the pattern by site-defined reduction of the metal ions to elemental metal particles.

37. The method according to claim 36, which comprises further developing the elemental metal particles to form self-assembled metal islands or metal films.

38. The method according to claim 36, wherein the functional group is selected from the group consisting of —SH, —S—S—, and a mixture thereof.

39. The method according to claim 36, wherein the metal ion is $Ag^+$.

40. A method for the production of a data storage medium, comprising:

(i) self-assembling an organic monolayer or multilayer film on a substrate, said multilayer film comprising a base organic monolayer and at least one additional organic layer;
(ii) non-destructively inscribing chemical information on the surface of said monolayer, said base monolayer, or said multilayer film using an electrically biased conducting scanning probe device and/or a stamping device; and
(iii) reading said inscribed chemical information by means of a scanning probe device,
wherein, if the pattern is inscribed on said monolayer or said base monolayer and said monolayer or said base monolayer is composed of an organosilane compound, said organosilane monolayer or organosilane base monolayer is not vinyl terminated at its top surface.

41. The method according to claim 40, wherein the electrically biased scanning probe and/or stamping device is selected from the group consisting of an AFM tip, an STM tip, a combined AFM-STM tip, a conducting silicon stamping device, and a liquid metal.

42. The method according to claim 40, wherein the electrically biased scanning probe and/or stamping device is an AFM tip operated in the lateral force mode.

43. A method for making a patterned organic monolayer film, comprising:
(i) self-assembling an organic monolayer film on a substrate; and
(ii) causing a predetermined chemical modification pattern to be non-destructively created on the top surface of said monolayer film by touching the film with a device that applies an electrical bias so as to chemically modify the top surface of the monolayer film only where said device touches the film, with the proviso that, if the monolayer film is composed of an organosilane compound, the top surface of the monolayer film is not vinyl terminated.

44. A method for making a patterned organic multilayer film, comprising:
(i) self-assembling an organic multilayer film on a substrate; and
(ii) causing a predetermined chemical modification pattern to be non-destructively created on the top surface of said multilayer film by touching the film with a device that applies an electrical bias so as to chemically modify the top surface of the multilayer film only where said device touches the film.

45. The method according to claim 43 or 44, wherein said device that applies an electrical bias is an electrically biased conducting scanning probe device that is a conducting AFM, STM or combined AFM-STM tip.

46. The method according to claim 43 or 44, wherein said device that applies an electrical bias is an electrically biased conducting stamping device that is a conducting metal grid, a metal plate or a stamp made of a conducting polymer or polymer-metal composite.

47. The method according to claim 43 or 44, wherein said device that applies an electrical bias is an electrically biased conducting liquid metal or metal alloy selected from the group consisting of Hg, Ga, and alloys of Hg, Ga, In, Sn or Pb.

* * * * *